(12) United States Patent
Murakami

(10) Patent No.: US 9,920,148 B2
(45) Date of Patent: Mar. 20, 2018

(54) VEHICLE PART COVER INCLUDING METHACRYLIC-BASED RESIN

(71) Applicant: Fumiki Murakami, Tokyo (JP)

(72) Inventor: Fumiki Murakami, Tokyo (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 61 days.

(21) Appl. No.: 14/435,999

(22) PCT Filed: Oct. 19, 2012

(86) PCT No.: PCT/JP2012/077073
§ 371 (c)(1),
(2) Date: Apr. 15, 2015

(87) PCT Pub. No.: WO2014/061149
PCT Pub. Date: Apr. 24, 2014

(65) Prior Publication Data
US 2015/0299360 A1    Oct. 22, 2015

(51) Int. Cl.
| | | |
|---|---|---|
| C08F 226/06 | (2006.01) | |
| C08K 5/52 | (2006.01) | |
| B60R 13/02 | (2006.01) | |
| C08L 39/04 | (2006.01) | |
| B60K 37/00 | (2006.01) | |
| C08F 220/18 | (2006.01) | |
| F21S 8/10 | (2006.01) | |

(52) U.S. Cl.
CPC ............ *C08F 226/06* (2013.01); *B60K 37/00* (2013.01); *B60R 13/02* (2013.01); *C08F 220/18* (2013.01); *C08K 5/52* (2013.01); *C08L 39/04* (2013.01); *F21S 48/125* (2013.01); *F21S 48/1233* (2013.01); *F21S 48/2212* (2013.01)

(58) Field of Classification Search
None
See application file for complete search history.

(56) References Cited

U.S. PATENT DOCUMENTS

| | | | | |
|---|---|---|---|---|
| 4,830,803 | A * | 5/1989 | Matsumaru | C08J 5/00 |
| | | | | 264/135 |
| 5,399,620 | A * | 3/1995 | Niessner | C08F 293/005 |
| | | | | 525/302 |
| 6,417,306 | B1 | 7/2002 | Ueda et al. | |
| 2003/0013829 | A1 | 1/2003 | Marutani et al. | |
| 2005/0119418 | A1 | 6/2005 | Matsumoto et al. | |
| 2006/0100391 | A1 | 5/2006 | Matsumoto et al. | |
| 2010/0087605 | A1 | 4/2010 | Yamamoto et al. | |
| 2010/0182689 | A1 | 7/2010 | Nakanishi et al. | |
| 2011/0263806 | A1 | 10/2011 | Dietrich et al. | |
| 2012/0004372 | A1 | 1/2012 | Kang et al. | |
| 2014/0024782 | A1 | 1/2014 | Kim et al. | |

FOREIGN PATENT DOCUMENTS

| | | |
|---|---|---|
| CN | 101918489 A | 12/2010 |
| JP | 59127303 A | 7/1984 |
| JP | 62112612 A | 5/1987 |
| JP | S62-109811 A | 5/1987 |
| JP | 63090516 A * | 4/1988 |
| JP | S63-090516 A | 4/1988 |
| JP | 02029405 A | 1/1990 |
| JP | H03-167245 A | 7/1991 |
| JP | 04145149 A | 5/1992 |
| JP | 04332745 A | 11/1992 |
| JP | H06-506962 A | 8/1994 |
| JP | H07-149819 A | 6/1995 |
| JP | 07216007 A | 8/1995 |
| JP | 08157535 A | 6/1996 |
| JP | 09324016 A | 12/1997 |
| JP | H10-045851 A | 2/1998 |
| JP | 2001226429 A | 8/2001 |
| JP | 2001233919 A | 8/2001 |
| JP | 2001270905 A | 10/2001 |
| JP | 2003-292714 A | 10/2003 |
| JP | 2003292714 A1 * | 10/2003 |
| JP | 2004071535 A | 3/2004 |
| JP | 2004139839 A | 5/2004 |
| JP | 2012-233180 A | 11/2012 |
| JP | 2014-024361 A | 2/2014 |
| WO | 93/03076 A1 | 2/1993 |
| WO | 2010/054909 A1 | 5/2010 |

OTHER PUBLICATIONS

Machine English translation_JP_2003292714_A1 ; Aihara, Sumio; Solvent-Resistant Resin Composition and Vehicle Lamp Lens Using the Same; Oct. 15, 2003; JPO; whole document.*
Abstract_JP_63090516_A; Sato, Funio; Heat-Resistant Thermoplastic Resin; Apr. 21, 1988; Derwent and JPO; whole document.*
Supplementary European Search Report issued in corresponding European Patent Application No. 12886513.6 dated Aug. 26, 2015.
International Search Report issued in corresponding International Patent Application No. PCT/JP2012/077073 dated Aug. 1, 2013.
International Preliminary Report on Patentability and Written Opinion issued in corresponding International Patent Application No. PCT/JP2012/077073 dated Apr. 21, 2015.

* cited by examiner

*Primary Examiner* — Tahseen N Khan
(74) *Attorney, Agent, or Firm* — Morgan, Lewis & Bockius LLP

(57) ABSTRACT

A vehicle part cover including a methacrylic-based resin (I) having a weight average molecular weight measured by gel permeation chromatography (GPC) of 65,000 to 300,000, the methacrylic-based resin (I) comprising:
  50 to 97% by mass of a methacrylate monomer unit (A);
  3 to 30% by mass of a structural unit (B) having a ring structure in its main chain, and being at least one selected from the group consisting of a maleimide-based structural unit, a glutaric anhydride structural unit, a glutarimide-based structural unit, and a lactone ring structural unit; and
  0 to 20% by mass of another vinyl monomer unit (C) that is copolymerizable with a methacrylate monomer.

19 Claims, No Drawings

VEHICLE PART COVER INCLUDING METHACRYLIC-BASED RESIN

TECHNICAL FIELD

The present invention relates to a vehicle part cover including a methacrylic-based resin.

BACKGROUND ART

Methacrylic-based resins represented by methyl polymethacrylate (PMMA) have high transparency, and are hence widely used in fields such as optical materials, vehicle parts, construction materials, lenses, housewares, OA devices, and lighting equipment.

Among these fields, in the field of covers used for vehicle parts, from the perspectives of scratch resistance and transparency, methacrylic-based resins are frequently used.

Recently, among vehicle parts to be mounted in a vehicle, vehicle interior parts have been increasingly installed in positions that tend to be exposed to direct sunlight from the perspectives of design of the vehicle interior, visibility of the instruments, and the like. Such vehicle interior parts tend to be subjected to high-temperature conditions more often than before, and need to have higher heat resistance.

Further, among vehicle parts, even for vehicle exterior parts applications, such as tail lamps and vehicle lamps, there is a need to reduce the thickness of the molded pieces to reduce weight. However, the heat resistance of conventional methacrylic-based resins is insufficient, and distortion can occur when exposed to high-temperature conditions unless the part has a certain thickness. Therefore, there is a need for a methacrylic-based resin with higher heat resistance than that of conventional ones.

In addition, among vehicle parts such as those described above, there are parts requiring transparency, such as an instrument cover and a tail lamp cover, which are required to allow a driver wearing polarized sunglasses to see through so that such driver can see the inside thereof.

When a resin having high birefringence is used as a material for such a part, it may be difficult to see inside through the part due to moire patterns resulting from distortion that was produced during molding.

To solve problems relating to visibility such as those described above, one option may be to increase the molding temperature so as to reduce molding distortion. However, the material needs to have even higher thermal stability.

In view of the above-described conventional situation, there are cases in which, from the perspective of heat resistance, a polycarbonate resin is used for the material of a vehicle part cover. However, since polycarbonate resins have poor scratch resistance and weatherability, a hard coat needs to be applied to the surface to impart scratch resistance and weatherability. As a result, there are the problems of limitations in the shape and an increase in costs.

In response to such problems, a resin having a methyl methacrylate homopolymer, for example, as a main component has been proposed as an acrylic-based resin having improved heat resistance (e.g., refer to Patent Literature 1). Further, a tail lamp lens that uses a maleic anhydride copolymer has been proposed (e.g., refer to Patent Literature 2).

CITATION LIST

Patent Literature

Patent Literature 1: Japanese Patent Laid-Open No. 2001-226429

Patent Literature 2: Japanese Patent Laid-Open No. 59-127303

SUMMARY OF INVENTION

Technical Problem

However, the acrylic-based resin described in Patent Literature 1 suffers from the problem that heat resistance is insufficient as the material for a vehicle part cover placed under high-temperature conditions such as those described above, and the problem that thermal stability is also insufficient, for example, silver streaks can occur during high-temperature molding.

Further, the acrylic-based resin described in Patent Literature 2 is used in Patent Literature 2 for a small molded object, such as a lamp lens. No consideration is given to thermal stability during molding processing, and thus the problem is that silver streaks can occur during high-temperature molding. Further, Patent Literature 2 also fails to consider exposure to hot and humid conditions. Therefore, currently there is still no material that has properties such as thermal stability during molding processing and durability under hot and humid conditions and that is suitable as a material for various vehicle part covers for rear lamp applications such as a tail lamp cover and a vehicle instrument cover applications such as a meter cover.

Accordingly, it is an object of the present invention to provide a vehicle part cover including a methacrylic-based resin that exhibits a greater improvement in heat resistance, and also has excellent transparency, resistance to heat and moisture, thermal stability, and molding processability.

Solution to Problem

As a result of diligent research into solving the above-described problems in the related art, the present inventors arrived at the present invention.

Namely, the present invention is as follows.

[1]

A vehicle part cover comprising a methacrylic-based resin (I) having a weight average molecular weight measured by gel permeation chromatography (GPC) of 65,000 to 300,000, the methacrylic-based resin (I) comprising:

50 to 97% by mass of a methacrylate monomer unit (A);

3 to 30% by mass of a structural unit (B) having a ring structure in its main chain, and being at least one selected from the group consisting of a maleimide-based structural unit, a glutaric anhydride structural unit, a glutarimide-based structural unit, and a lactone ring structural unit; and 0 to 20% by mass of another vinyl monomer unit (C) that is copolymerizable with a methacrylate monomer.

[2]

The vehicle part cover according to [1], comprising 10 to 99% by mass of the methacrylic-based resin (I), and further comprising 90 to 1% by mass of a methacrylic-based resin (II) that comprises at least 80 to 99.5% by mass of a methacrylate monomer unit (A'), and that has a weight average molecular weight measured by gel permeation chromatography (GPC) of 20,000 to 300,000.

[3]

The vehicle part cover according to [2], wherein a weight average molecular weight of a methacrylic-based resin obtained by mixing the methacrylic-based resin (I) and the methacrylic-based resin (II) is 65,000 to 300,000.

[4]
The vehicle part cover according to any one of [1] to [3], wherein the structural unit (B) having a ring structure in its main chain comprises at least one selected from the group consisting of a glutarimide-based structural unit, a lactone ring structural unit, and a maleimide-based structural unit.

[5]
The vehicle part cover according to any one of [1] to [4], wherein the structural unit (B) having a ring structure in its main chain comprises a maleimide-based structural unit.

[6]
The vehicle part cover according to any one of [1] to [5], wherein the structural unit (B) having a ring structure in its main chain comprises a N-cyclohexylmaleimide-based structural unit and/or a N-aryl group-substituted maleimide-based structural unit.

[7]
The vehicle part cover according to any one of [1] to [6], wherein the structural unit (B) having a ring structure in its main chain comprises a N-aryl group-substituted maleimide-based structural unit.

[8]
The vehicle part cover according to any one of [1] to [7], further comprising 0 parts by mass to 5 parts by mass of a thermal stabilizer based on 100 parts by mass of the methacrylic-based resin.

[9]
The vehicle part cover according to [8], wherein a content ratio Y (parts by mass) of the thermal stabilizer based on 100 parts by mass of the methacrylic-based resin satisfies the following formula (i):

$$(Y) \geq 0.053 \times [\text{methacrylate monomer unit content}/(B) \text{ content}] - 0.4 \quad (i)$$

[10]
The vehicle part cover according to [8] or [9], wherein the thermal stabilizer is at least one selected from the group consisting of a hindered phenol antioxidant and a phosphorus-based antioxidant.

[11]
The vehicle part cover according to any one of [1] to [10], wherein the another vinyl monomer unit (C) that is copolymerizable with the methacrylate monomer is formed from at least one selected from the group consisting of an acrylate monomer, an aromatic vinyl monomer, and a vinyl cyanide monomer.

[12]
The vehicle part cover according to any one of [1] to [11], wherein the another vinyl monomer unit (C) that is copolymerizable with the methacrylate monomer is formed from at least one selected from the group consisting of methyl acrylate, ethyl acrylate, styrene, and acrylonitrile.

[13]
The vehicle part cover according to any one of [1] to [12], having a Vicat softening temperature of 110° C. or more.

[14]
The vehicle part cover according to any one of [1] to [13], having a thickness of 0.1 to 5 mm.

[15]
The vehicle part cover according to any one of [1] to [14], wherein the vehicle part cover is:
a vehicle instrument cover selected from the group consisting of a vehicle clock cover, an indicator cover, a combination meter cover, a meter cover, and a vehicle head-up display, or
a vehicle rear lamp cover selected from the group consisting of a tail lamp cover, a rear combination lamp cover, and a high mount stop lamp cover.

[16]
The vehicle part cover according to any one of [1] to [14], wherein the vehicle part cover is a vehicle instrument cover selected from the group consisting of a vehicle clock cover, an indicator cover, a combination meter cover, a meter cover, and a vehicle head-up display.

[17]
The vehicle part cover according to any one of [1] to [14], wherein the vehicle part cover is a vehicle rear lamp cover selected from the group consisting of a tail lamp cover, a rear combination lamp cover, and a high mount stop lamp cover.

Advantageous Effects of Invention

According to the present invention, a vehicle part cover including a methacrylic resin can be provided that has high heat resistance and also excellent transparency, resistance to heat and moisture, thermal stability, and molding processability.

DESCRIPTION OF EMBODIMENTS

Embodiments for carrying out the present invention (hereinafter, referred to as "the present embodiment") are described below in more detail. However, the present invention is not limited to the following description, and may be variously modified within the gist thereof.

It is noted that, in the following, the constituent units constituting the polymer are referred to as "monomer unit."

Further, in referring to a monomer unit of the constituent material of the methacrylic-based resin constituting the vehicle part cover according to the present embodiment, the term "monomer" may simply be used by itself, omitting the term "unit".

[Vehicle Part Cover]

The vehicle part cover according to the present embodiment includes a methacrylic-based resin (I) having a weight average molecular weight measured by gel permeation chromatography (GPC) of 65,000 to 300,000, the methacrylic-based resin (I) containing:
50 to 97% by mass of a methacrylate monomer unit (A);
3 to 30% by mass of a structural unit (B) having a ring structure in its main chain of at least one selected from the group consisting of a maleimide-based structural unit, a glutaric anhydride structural unit, a glutarimide-based structural unit, and a lactone ring structural unit; and
0 to 20% by mass of another vinyl monomer unit (C) that is copolymerizable with the methacrylate monomer.

Further, the vehicle part cover according to the present embodiment may further comprise, based on 10 to 99 parts by mass of the methacrylic-based resin (I), 90 to 1 part by mass of a methacrylic-based resin (II) which comprises at least 80 to 99.5% by mass of a methacrylate monomer unit (A'), and has a weight average molecular weight measured by gel permeation chromatography (GPC) of 20,000 to 300,000.

The methacrylic-based resin (II) is described below.

The methacrylic-based resin included in the vehicle part cover according to the present embodiment is now described in more detail.

(Methacrylic-Based Resin (I))

The above-described methacrylic-based resin (I) has a weight average molecular weight measured by gel permeation chromatography (GPC) of 65,000 to 300,000, and it comprises:

50 to 97% by mass of a methacrylate monomer unit (A);

3 to 30% by mass of a structural unit (B) having a ring structure in its main chain, and being at least one selected from the group consisting of a glutaric anhydride structural unit, a glutarimide-based structural unit, a lactone ring structural unit, and a maleimide-based structural unit; and 0 to 20% by mass of another vinyl monomer unit (C) that is copolymerizable with the methacrylate monomer (A).

The methacrylic-based resin (I) for the vehicle part cover according to the present embodiment, and a mixed methacrylic-based resin obtained by mixing a below-described methacrylic-based resin (II) with the methacrylic-based resin (I) as needed, are used in fields where a molded object having a thinner wall is required. Therefore, these methacrylic-based resins need high heat resistance. It is preferred that the Vicat softening temperature of the molded object is 110° C. or more, more preferred is 112° C. or more, even more preferred is 113° C. or more, still even more preferred is 115° C. or more, yet still even more preferred is 117° C. or more, and especially preferred is 120° C. or more.

The Vicat softening temperature can be measured in accordance with ISO 306 B50. Specifically, the Vicat softening temperature can be measured by the method described in the below-described Examples.

Each of the monomer components in the methacrylic-based resin (I) will now be described in more detail.

<Methacrylate Monomer Unit (A)>

As the methacrylate monomer unit (A) (hereinafter sometimes referred to as component (A)) constituting the methacrylic-based resin (I) for the vehicle part cover according to the present embodiment, a monomer represented by the following general formula (1) is suitably used.

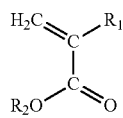

(1)

In the above general formula (1), $R_1$ represents a methyl group.

$R_2$ represents a group having 1 to 12 carbon atoms, preferably a hydrocarbon group having 1 to 12 carbon atoms, and may have a hydroxyl group on a carbon.

Examples of the methacrylate monomer represented by the above general formula (1) include, but are not especially limited to, butyl methacrylate, ethyl methacrylate, methyl methacrylate, propyl methacrylate, isopropyl methacrylate, cyclohexyl methacrylate, phenyl methacrylate, (2-ethylhexyl) methacrylate, (t-butyl cyclohexyl) methacrylate, benzyl methacrylate, and (2,2,2-trifluoroethyl) methacrylate. From the perspectives of heat resistance, handling properties, and optical properties, methyl methacrylate, ethyl methacrylate, cyclohexyl methacrylate, phenyl methacrylate, and benzyl methacrylate are preferred, and from perspectives such as availability, methyl methacrylate is preferred.

The above-described methacrylate monomers can be used singly or in combinations of two or more thereof.

From the perspective of a heat resistance-improving effect of the below-described structural unit (B) having a ring structure in its main chain, the content of the methacrylate monomer unit (A) in the above-described methacrylic-based resin (I) is 50 to 97% by mass, preferably 55 to 97% by mass, more preferably 55 to 95% by mass, even more preferably 60 to 93% by mass, and still even more preferably 60 to 90% by mass.

Note that even when the vehicle part cover according to the present embodiment includes both the above-described methacrylic-based resin (I) and the below-described methacrylic-based resin (II), from the perspective of the heat resistance-improving effect of the below-described structural unit (B) having a ring structure in its main chain, the total content of the methacrylate monomer units ((A)+(A')) included in this mixed methacrylic-based resin is 50 to 97% by mass, preferably 55 to 97% by mass, more preferably 55 to 95% by mass, even more preferably 60 to 93% by mass, and still even more preferably 60 to 90% by mass.

<Structural Unit (B) Having a Ring Structure in its Main Chain>

The structural unit (B) having a ring structure in its main chain (hereinafter sometimes referred to as component (B)) constituting the methacrylic-based resin (I) for the vehicle part cover according to the present embodiment is at least one selected from the group consisting of a glutaric anhydride structural unit, a glutarimide-based structural unit, a lactone ring structural unit, and a maleimide-based structural unit.

The structural unit (B) having a ring structure in its main chain can be used singly or in combinations of two or more thereof. Two or more monomer units having a common structural unit may also be used in combination.

[Maleimide-Based Structural Unit (B-1)]

As the maleimide-based structural unit (B-1) constituting the methacrylic-based resin (I) for the vehicle part cover according to the present embodiment, a monomer represented by the following general formula (2) is suitably used.

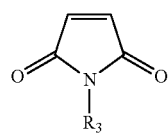

(2)

In the above general formula (2), $R_3$ represents any one selected from the group consisting of a hydrogen atom, an alkyl group having 1 to 12 carbon atoms, an alkoxy group having 1 to 12 carbon atoms, and an aryl group having 6 to 12 carbon atoms, and $R_3$ may have a substituent on a carbon atom.

Examples of the monomer for forming the maleimide-based structural unit (B-1) include, but are not especially limited to, maleimide, N-methylmaleimide, N-ethylmaleimide, N-cyclohexylmaleimide, N-phenylmaleimide, N-methylphenylmaleimide, N-ethylphenylmaleimide, N-butylphenylmaleimide, N-dimethylphenylmaleimide, N-hydroxyphenylmaleimide, N-methoxyphenylmaleimide, N-(o-chlorophenyl)maleimide, N-(m-chlorophenyl)maleimide, and N-(p-chlorophenyl)maleimide.

From the perspective of imparting heat resistance and resistance to heat and moisture, preferred examples include N-cyclohexylmaleimide, N-phenylmaleimide, N-methylphenylmaleimide, N-(o-chlorophenyl)maleimide, N-(m-chlorophenyl)maleimide, and N-(p-chlorophenyl)maleimide. From the perspectives of availability and imparting heat resistance, more preferred examples include N-cyclohexylmaleimide and N-phenylmaleimide, and even more preferred is N-phenylmaleimide.

The above-described maleimide-based structural units (B-1) can be used singly or in combinations of two or more thereof.

[Glutaric Anhydride Structural Unit (B-2)]

As the monomer for forming the glutaric anhydride structural unit (B-2), which is an option of the component (B) constituting the methacrylic-based resin (I) for the vehicle part cover according to the present embodiment, a monomer represented by the following general formula (3) is suitably used.

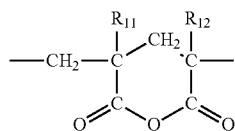

(3)

In the general formula (3), $R_{11}$ and $R_{12}$ each independently represent a hydrogen atom or a substituted or unsubstituted alkyl group having 1 to 6 carbon atoms, and the alkyl group may be substituted with a hydroxyl group, for example.

Examples of the method of producing the glutaric anhydride structural unit (B-2) include, but are not especially limited to, copolymerizing a monomer having a structure represented by the following general formula (4) with the above-described methacrylate monomer (A), and then cyclizing the obtained copolymer by heat treating in the presence/absence of a catalyst to introduce a glutaric anhydride structural unit into the polymer.

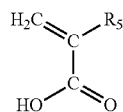

(4)

Here, in general formula (4), $R_5$ represents a hydrogen atom or a substituted or unsubstituted alkyl group having 1 to 6 carbon atoms, and the alkyl group may have, for example, an acetoxy group, a carbonyl group, a ketone group, a carboxyl group, a mercapto group, and a hydroxyl group.

Further, the structural unit represented by general formula (4) may remain unreacted in the methacrylic-based resin (I) to the extent that the effects of the present invention can be exhibited.

[Glutarimide-Based Structural Unit (B-3)]

As the monomer for forming the glutarimide-based structural unit (B-3), which is an option of the component (B) constituting the methacrylic-based resin (I) for the vehicle part cover according to the present embodiment, a monomer represented by the following general formula (5) is suitably used.

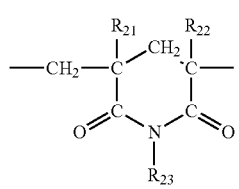

(5)

Here, in general formula (5), $R_{21}$ and $R_{22}$ each independently represent a hydrogen atom or a substituted or unsubstituted alkyl group having 1 to 6 carbon atoms.

The alkyl group may be substituted with a hydroxyl group, for example.

Further, $R_{23}$ represents a hydrogen atom, a substituted or unsubstituted alkyl group having 1 to 6 carbon atoms, or a substituted or unsubstituted aryl group having 6 to 18 carbon atoms.

The glutarimide-based structural unit (B-3) can be produced based on known methods such as a method comprising the steps of: copolymerizing the above-described methacrylate monomer and/or methacrylic acid; and then reacting it with ammonia, amine, urea, or unsubstituted urea at a high temperature, and a method comprising a step of reacting polymethacrylic anhydride with ammonia or amine.

An example of a preferred preparation method is described in U.S. Pat. No. 4,246,374 to R. M. Kopchik.

[Lactone Ring Structural Unit (B-4)]

As the monomer for forming the lactone ring structural unit (B-4), which is an option of the component (B) constituting the methacrylic-based resin (I) for the vehicle part cover according to the present embodiment, a monomer represented by the following general formula (6) is suitably used.

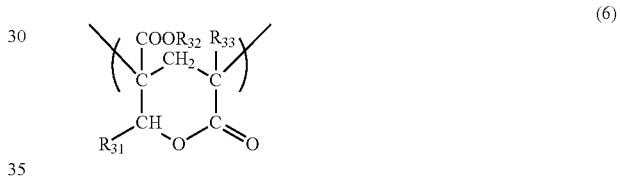

(6)

In the above formula (6), $R_{31}$, $R_{32}$, and $R_{33}$ each independently represent a hydrogen atom or an organic residue having 1 to 20 carbon atoms. Note that the organic residue may include an oxygen atom.

The lactone ring structural unit (B-4) can be used singly or in combinations of two or more thereof.

Examples of the method of producing the lactone ring-containing polymer include, but are not especially limited to, a method comprising the steps of polymerizing a polymer having a hydroxyl group and an ester group in its molecular chain, and then subjecting the polymer to a heat treatment in the presence/absence of a predetermined catalyst to introduce a lactone ring structure into the obtained polymer.

From the perspectives of thermal stability and molding processability, as the component (B) included in the above-described methacrylic-based resin (I), preferred are a glutarimide-based structural unit, a lactone ring structural unit, and a maleimide-based structural unit, more preferred are a maleimide-based structural unit and a glutarimide-based structural unit, and even more preferred is a maleimide-based structural unit.

In consideration of availability, preferred is a N-cyclohexylmaleimide structural unit and/or a N-aryl-substituted maleimide structural unit. In consideration of an effect of imparting heat resistance with a small amount, a N-aryl-substituted maleimide structural unit is more preferred, and even more preferred is a N-phenylmaleimide structural unit.

<Content Ratio of Component (B)>

From the perspectives of imparting heat resistance and thermal stability to the obtained methacrylic-based resin (I), and the strength and fluidity of the obtained methacrylic-based resin (I), the content in the methacrylic-based resin (I) of the structural unit (B) having a ring structure in its main chain is 3 to 30% by mass.

From the perspectives of imparting heat resistance and thermal stability, the content is preferably 5% by mass or more, more preferably 7% by mass or more, and even more preferably 8% by mass or more.

Further, from the perspective of maintaining a good balance between fluidity and the strength required as a vehicle part cover, it is preferred that the content in the methacrylic-based resin (I) of the structural unit (B) having a ring structure in its main chain is 28% by mass or less, more preferred is 25% by mass or less, even more preferred is 20% by mass or less, still even more preferred is 18% by mass or less, and yet still even more preferred is less than 15% by mass.

In addition, even when the vehicle part cover according to the present embodiment includes both the above-described methacrylic-based resin (I) and the below-described methacrylic-based resin (II), from the perspectives of imparting heat resistance and thermal stability, the content in the mixed methacrylic-based resin of the structural unit (B) having a ring structure in its main chain is 3 to 30% by mass, preferably 5% by mass or more, more preferably 7% by mass or more, and even more preferably 8% by mass or more.

<Relationship Between Structural Unit (B) Having a Ring Structure in its Main Chain and Thermal Stability>

By including the structural unit (B) having a ring structure in its main chain in the methacrylic-based resin (I), when the methacrylic-based resin is placed in a high-temperature environment, thermal degradation is suppressed, and the amount of the produced volatilized components can be reduced. Consequently, an effect of improvement in the thermal stability of the vehicle part cover according to the present embodiment can be obtained.

<Another Vinyl Monomer Unit (C) that is Copolymerizable with the Methacrylate Monomer>

In the methacrylic-base resin (I) for the vehicle part cover according to the present embodiment, to the extent that the effects of the present invention are not harmed, another vinyl monomer unit (C) (hereinafter sometimes referred to as component (C)) that is copolymerizable with the monomer constituting the above-described component (A) (hereinafter sometimes simply referred to as component (A)) may be contained.

When using the another vinyl monomer unit (C) that is copolymerizable with the above-described component (A), from the perspective of exhibiting the effect from component (B) of imparting heat resistance, the content in the methacrylic-based resin (I) is 0 to 20% by mass, preferably 0 to 18% by mass, and more preferably 0 to 15% by mass.

Examples of the monomer for forming the above-described component (C) include, but are not limited to, aromatic vinyl monomers represented by the following general formula (7) and acrylate monomers represented by general formula (8); vinyl cyanide monomers, such as acrylonitrile and methacrylonitrile; amides, such as acrylamide and methacrylamide; compounds formed by esterification of both end hydroxyl groups of an ethylene glycol or an oligomer thereof, with acrylic acid or methacrylic acid, such as ethyleneglycol di(meth)acrylate, diethyleneglycol di(meth)acrylate, triethyleneglycol di(meth)acrylate, and tetraethyleneglycol di(meth)acrylate; compounds formed by esterification of hydroxyl groups of a dihydroxy alcohol with acrylic acid or methacrylic acid, such as neopentylglycol di(meth)acrylate and di(meth)acrylate; compounds formed by esterification of a polyhydric alcohol derivative such as trimethylolpropane and pentaerythritol with acrylic acid or methacrylic acid; and polyfunctional monomers such as divinylbenzene.

(7)

In the above general formula (7), $R_{44}$ represents a hydrogen atom or an alkyl group having 1 to 6 carbon atoms, and the alkyl group may have a hydroxyl group.

n denotes an integer of 0 to 5.

$R_{45}$ represents any one selected from the group consisting of a hydrogen atom, an alkyl group having 1 to 12 carbon atoms, an alkoxy group having 1 to 12 carbon atoms, an aryl group having 1 to 8 carbon atoms, and an aryloxy group having 1 to 8 carbon atoms. $R_{45}$ may all be the same group, or different groups.

Further, plural $R_{45}$ may form a ring structure.

(8)

In the above general formula (8), $R_6$ is a hydrogen atom and $R_7$ is an alkyl group having 1 to 18 carbon atoms.

The above-described component (C) may be appropriately selected based on the properties demanded for the vehicle part cover according to the present embodiment. When properties such as heat resistance, fluidity, mechanical properties, and chemical resistance are especially required, an aromatic vinyl monomer unit, an acrylate monomer unit, and a vinyl cyanide monomer unit are suitable.

[Aromatic Vinyl Monomer Unit (C-1)]

Examples of the monomer for forming the above-described aromatic vinyl monomer unit include, but are not especially limited to, styrene, o-methylstyrene, m-methylstyrene, p-methylstyrene, 2,4-dimethylstyrene, 2,5-dimethylstyrene, 3,4-dimethylstyrene, 3,5-dimethylstyrene, p-ethylstyrene, m-ethylstyrene, o-ethylstyrene, p-tert-butylstyrene, 1-vinylnaphthalene, 2-vinylnaphthalene, 1,1-diphenylethylene, isopropenylbenzene (α-methylstyrene), isopropenyltoluene, isopropenylethylbenzene, isopropenylpropylbenzene, isopropenylbutylbenzene, isopropenylpentylbenzene, isopropenylhexylbenzene, and isopropenyloctylbenzene.

These monomers may be appropriately selected based on the properties demanded for the methacrylic-based resin for the vehicle part cover according to the present embodiment. Among these, styrene and isopropenylbenzene are preferred. From the perspectives of imparting fluidity, reducing unreacted monomers by improving the polymerization conversion rate, and the like, styrene is more preferred.

When using the aromatic vinyl monomer unit (C-1), it is preferred that the content of the aromatic vinyl monomer unit (C-1) is, in consideration of balance among heat resistance, reducing residual monomer species, and fluidity, based on a total amount of component (A) and component (B) of 100 parts by mass, 23 parts by mass or less, more preferred is 20 parts by mass or less, even more preferred is 18 parts by mass or less, still even more preferred is 15 parts by mass or less, and yet still even more preferred is 10 parts by mass or less.

When the aromatic vinyl monomer unit (C-1) is used with the above-described maleimide-based monomer unit (B-1), from perspectives such as the processing fluidity when molding and processing the vehicle part cover and the effect of a reduction in silver streaks due to a reduction in residual monomers, it is preferred that the blending ratio (mass ratio) thereof satisfies the following formula.

$$0.3 \leq (C\text{-}1)/(B\text{-}1) \leq 5$$

From the perspective of maintaining a good color hue and heat resistance, it is preferred that the upper value is 5 or less, more preferred is 3 or less, and even more preferred is 1 or less.

Further, from the perspective of reducing residual monomers, it is preferred that the ratio is 0.3 or more, and more preferred is 0.4 or more.

The above-described aromatic vinyl monomers (C-1) can be used singly or in combinations of two or more thereof.

[Acrylate Monomer Unit (C-2)]

Examples of the monomer for forming the above-described acrylate monomer unit include, as described above, compounds in which the substituent $R_7$ in the above general formula (8) is an alkyl group having 1 to 18 carbon atoms. Among these, from the perspective of improving weatherability, heat resistance, fluidity, and thermal stability in the methacrylic-based resin for the vehicle part cover according to the present embodiment, methyl acrylate, ethyl acrylate, n-propyl acrylate, n-butyl acrylate, sec-butyl acrylate, 2-ethylhexyl acrylate, cyclohexyl acrylate, phenyl acrylate, and the like are preferred, and more preferred are methyl acrylate, ethyl acrylate, and n-butyl acrylate. From the perspective of availability, methyl acrylate is still more preferred.

When using the acrylate monomer unit (C-2), from the perspectives of heat resistance and thermal stability, it is preferred that the content of the acrylate monomer unit (C-2) is 5 parts by mass or less, and more preferred is 3 parts by mass or less based on a total amount of component (A) and component (B) of 100 parts by mass.

The monomers for forming the acrylate monomer unit (C-2) can be used singly or in combinations of two or more thereof.

[Vinyl Cyanide Monomer Unit (C-3)]

Examples of the monomer for forming the above-described vinyl cyanide monomer unit include, but are not especially limited to, acrylonitrile, methacrylonitrile, and vinylidene cyanide. Among these, from the perspectives of availability and imparting chemical resistance, acrylonitrile is suitably used.

When using the vinyl cyanide monomer unit (C-3), it is preferred that the content of the vinyl cyanide monomer unit (C-3) is, from the perspectives of solvent resistance and thermal stability maintenance, 15 parts by mass or less, more preferred is 12 parts by mass or less, and even more preferred is 10 parts by mass or less, based on a total amount of component (A) and component (B) of 100 parts by mass.

(Molecular Weight and Molecular Weight Distribution of the Methacrylic-Based Resin (I))

The methacrylic-based resin (I) for the vehicle part cover according to the present embodiment has a weight average molecular weight of 65,000 or more and 300,000 or less. A methacrylic-based resin having a weight average molecular weight in this range has excellent mechanical strength, solvent resistance, and fluidity. It is preferred that the methacrylic-based resin (I) has a weight average molecular weight of 65,000 or more and 250,000 or less, and more preferred is 70,000 or more and 230,000 or less.

Further, in consideration of a balance between fluidity and mechanical strength and solvent resistance, it is preferred that the molecular weight distribution (weight average molecular weight/number average molecular weight: Mw/Mn) of the methacrylic-based resin (I) is 1.5 or more and 5 or less, more preferred is 1.5 or more and 4.5 or less, even more preferred is 1.6 or more and 4 or less, still even more preferred is 1.6 or more and 3 or less, and yet still even more preferred is 1.5 or more and 2.5 or less.

The weight average molecular weight and the number average molecular weight of the methacrylic-based resin (I) for the vehicle part cover according to the present embodiment are measured by gel permeation chromatography (GPC).

Namely, a calibration curve is plotted in advance from elution times and the weight average molecular weights of standard methacrylic resins that can be obtained as monodisperse reagents having known weight average molecular weights, number average molecular weights, and peak molecular weights, by using an analysis gel column that elutes a high molecular weight component first. Next, based on the obtained calibration curve, the weight average molecular weight and the number average molecular weight of a specimen of the methacrylic-based resin, which is the measurement target, can be determined.

Specifically, the weight average molecular weight and the number average molecular weight can be measured based on the method described in the below-described Examples.

(Amount of Residual Monomers)

In the vehicle part cover according to the present embodiment, in consideration of the balance among heat resistance, fluidity, processability during molding, and scratch resistance, it is preferred that the content of the residual monomers in the vehicle part cover according to the present embodiment is 0.1 to 1.5% by mass, more preferred is 0.1 to 1% by mass, even more preferred is 0.2 to 1% by mass, still even more preferred is 0.2 to 0.8% by mass, and yet still even more preferred is 0.3 to 0.8% by mass.

The amount of residual monomers can be measured by gas chromatography, specifically, can be measured based on the method described in the below-described Examples.

The term residual monomers used herein refers to the monomers remaining in the resin, namely, the components (A), (B), and (C) included in the methacrylic-based resin (I), and the component (A') and another copolymerizable component (C') included in the below-described methacrylic-based resin (II), which can be detected by gas chromatography.

Further, when using a maleimide-based monomer as component (B), from the perspectives of the color hue, fluidity, heat resistance, thermal stability, and scratch resistance, it is preferred that the residual monomer content of the remaining maleimide-based monomers in the vehicle part cover according to the present embodiment is 0.001 to 0.8% by mass, more preferred is 0.002 to 0.7% by mass, even more preferred is 0.003 to 0.5% by mass, still even more preferred is 0.005 to 0.5% by mass, and yet still even more preferred is 0.01 to 0.44% by mass.

(Method of Producing Methacrylic-Based Resin (I))

A method of producing the methacrylic-based resin (I) for the vehicle part cover according to the present embodiment is now described. However, the method of producing the methacrylic-based resin (I) for the vehicle part cover according to the present embodiment is not limited to the following method.

The methacrylic-based resin (I) can be produced by a bulk polymerization method, a solution polymerization method, a suspension polymerization method, a sedimentation polymerization method, and an emulsion polymerization method, using the methacrylate monomer (A), the structural unit (B) having a ring structure in its main chain, and optionally the another vinyl monomer (C) that is copolymerizable with the above-described methacrylate monomer. It is preferred that a bulk polymerization method, a solution polymerization method, and a suspension polymerization method are used, more preferred are a solution polymerization method and a suspension polymerization method, and even more preferred is a suspension polymerization method.

<Production Method Based on Solution Polymerization Method>

When producing the methacrylic-based resin (I) by a solution polymerization method, in consideration of the removal efficiency in the step of removing the monomers remaining in the methacrylic-based resin, an organic solvent, which is a good solvent for the methacrylic-based resin, is used.

Considering the solubility of the copolymer constituting the methacrylic-based resin (I), it is preferred that the solubility parameter δ of the organic solvent is 7.0 to 12.0 $(cal/cm^3)^{1/2}$, more preferred is 8.0 to 11.0, and even more preferred is 8.2 to 10.5.

Regarding the value of the solubility parameter δ and the method for determining the value, for example, "New Values of the Solubility Parameters From Vapor Pressure Data" by K. L. Hoy submitted in P. 76 to P. 118 of the non-patent literature "Journal of Paint Technology Vol. 42, No. 541, February 1970" and P-VII/675-P714, "Polymer Handbook Fourth Edition" by J. Brandrup et al can be used as a reference.

Note that 1 $(cal/cm^3)^{1/2}$ corresponds approximately to 0.489 $(MPa)^{1/2}$.

It is preferred that the additive amount of the organic solvent that is used in the polymerization step of the methacrylic-based resin (I) for the vehicle part cover according to the present embodiment is an amount that enables polymerization to proceed, but does not cause precipitation and the like of the copolymer or monomers used during production, and can be easily removed.

The amount of the organic solvent to be blended when performing a solution polymerization method is, specifically, based on a total of 100 parts by mass of the monomers to be blended, preferably 10 parts by mass or more and 200 parts by mass or less, more preferably 25 parts by mass or more and 200 parts by mass or less, even more preferably 50 parts by mass or more and 200 parts by mass or less, and still even more preferably 50 parts by mass or more and 150 parts by mass or less.

The polymerization temperature when producing the methacrylic-based resin (I) by solution polymerization may be a temperature at which polymerization proceeds. However, from the perspective of productivity, 50° C. or more and 200° C. or less is preferred, more preferred is 80° C. or more and 200° C. or less, even more preferred is 90° C. or more and 200° C. or less, still even more preferred is 100° C. or more and 180° C. or less, and yet still even more preferred is 110° C. or more and 170° C. or less.

Further, the polymerization time is not especially specified as long as the required degree of polymerization can be obtained. However, from the perspective of productivity and the like, 0.5 hours or more and 10 hours or less is preferred, and more preferred is 1 hour or more and 8 hours or less.

It is preferred that the dissolved oxygen concentration in the polymerization solution during the polymerization step of the methacrylic-based resin (I) is 10 ppm or less. The dissolved oxygen concentration can be measured, for example, using a dissolved oxygen meter, DO Meter B-505 (manufactured by Iijima Electronics Corporation). The method of lowering the dissolved oxygen concentration may be appropriately selected from among methods such as bubbling an inert gas into the polymerization solution, repeating an operation before polymerization of increasing the pressure in a vessel containing the polymerization solution with an inert gas to about 0.2 MPa and then reducing the pressure, and passing an inert gas through the vessel containing the polymerization solution.

<Production Method Based on Suspension Polymerization Method>

When producing the methacrylic-based resin (I) for the vehicle part cover according to the present embodiment by suspension polymerization such as an organic suspension polymerization method or an inorganic suspension polymerization method, a granular methacrylic-based resin (I) is produced by carrying out a polymerization step using a below-described stirring device, a washing step, a dewatering step, and a drying step. Normally, an aqueous suspension polymerization method that uses water as a medium is suitably used.

<Polymerization Step>

Using the below-described stirring device, polymerization is carried out by appropriately feeding the monomers as the raw materials, a suspension agent, and optionally a polymerization initiator, and other additives into the stirring device to obtain a methacrylic-based resin slurry.

Examples of the stirring device used in the polymerization step for obtaining the methacrylic-based resin by a suspension polymerization method include known stirring devices, such as a stirring device having in its interior a stirring blade, such as an inclined paddle blade, a flat paddle blade, a propeller blade, an anchor blade, a Pfaudler blade (retracting blade), a turbine blade, a bull margin blade, a max blend blade, a full zone blade, a ribbon blade, a super mix blade, an intermig blade, a special blade, and an axial-flow blade, a stirring device having a shovel blade in its interior, a stirring device having a chopper blade in its interior, and a stirring device having in its interior a rotating disc, such as a disk-shaped disc, a notched disc, or a screw type disc.

Although the stirring rate during polymerization also depends on the type of stirring device to be used, the stirring efficiency of the stirring blade, the capacity of the polymerization tank, and the like, it is preferred that the stirring rate is about 1 to 500 rpm, for reasons such as the fact that an appropriate particle size can be obtained, the content of the component having a particle size less than 0.15 mm can be reduced, and polymerization stability can be achieved.

In the polymerization step of the methacrylic-based resin (I), the temperature when adding the raw materials may be within a range in which the effects of the present invention can be exhibited. It is preferred that the temperature is 0° C. or more, and equal to or less than the boiling point of the raw materials to be used.

If the temperature is high, the raw materials tend to volatilize during addition, and thus the composition of the obtained copolymer may change. Further, some raw materials may be transformed, for example, may be partially hydrolyzed, by contact with moisture at a high temperature, and the color hue change under hot and humid conditions may increase. If the temperature is as low as less than 0° C., it takes time to increase the temperature after addition of the raw materials. Therefore, it is preferred to add the raw material mixture at a certain level of temperature.

Specifically, it is preferred that the temperature is 0° C. or more and 85° C. or less, more preferred is 10° C. or more and 85° C. or less, even more preferred is 10° C. or more and 80° C. or less, still even more preferred is 15° C. or more and 70° C. or less, and yet still even more preferred is 15° C. or more and 60° C. or less.

Considering productivity and an amount of agglomerates produced, it is preferred that the temperature during the suspension polymerization step is 40° C. or more and 90° C. or less, more preferred is 50° C. or more and 85° C. or less, even more preferred is 60° C. or more and 80° C. or less, and still even more preferred is 65° C. or more and 80° C. or less.

In order to effectively suppress the generation of heat during polymerization, and to reduce the occurrence of the below-described agglomerates and the residual monomers, it is preferred that the polymerization time in the case of production by suspension polymerization is 20 minutes or more and 240 minutes or less, more preferred is 30 minutes or more and 210 minutes or less, even more preferred is 45 minutes or more and 180 minutes or less, still even more preferred is 60 minutes or more and 180 minutes or less, and yet still even more preferred is 90 minutes or more and 150 minutes or less.

Further, from the perspective of reducing residual monomers, it is preferred to, after the above-described polymerization step, increase the temperature to a higher temperature than the polymerization temperature, and hold at that temperature for a fixed period.

It is preferred that the holding temperature is higher than the polymerization temperature, since it enables to increase the degree of polymerization. In the case of increasing the temperature, it is preferred to increase the temperature to a temperature that is higher by 5° C. or more than the polymerization temperature.

When increasing the temperature, from the perspective of preventing agglomeration of the obtained polymer, it is preferred that the temperature is equal to or less than the glass transition temperature of the methacrylic-based resin (I) to be obtained. Specifically, the temperature is 120° C. or less, preferably 80° C. or more and 120° C. or less, more preferably 90° C. or more and 120° C. or less, even more preferably 93° C. or more and 120° C. or less, and still even more preferably 93° C. or more and 110° C. or less.

By performing polymerization under the condition of the above-described polymerization temperature and the holding time, polymer particles having a small repose angle can be obtained after carrying out the below-described drying step.

It is preferred that the time for holding the temperature after increasing the temperature is, in consideration of the effect of reducing residual monomers, 15 minutes or more and 360 minutes or less, more preferred is 30 minutes or more and 240 minutes or less, even more preferred is 30 minutes or more and 180 minutes or less, still even more preferred is 30 minutes or more and 150 minutes or less, and yet still even more preferred is 30 minutes or more and 120 minutes or less.

<Washing Step>

To remove the suspension agent, it is preferred to subject the slurry of the methacrylic-based resin (I) obtained by the above-described polymerization step to an operation such as acid cleaning, water washing, and alkali cleaning.

As the number of times for performing these washing operations, the optimum number can be selected based on the operation efficiency and the removal efficiency of the suspension agent. The operations may be carried out once or repeated a plurality of times The optimum temperature for performing the washing may be selected in consideration of the removal efficiency of the suspension agent, the degree of coloration of the obtained copolymer, and the like. Preferably, this temperature is 20 to 100° C., more preferably 30 to 95° C., and still more preferably 40 to 95° C.

The washing time per a washing operation is, from the perspectives of washing efficiency, repose angle reduction effect, and step simplicity, preferably 10 to 180 minutes, and more preferably 20 to 150 minutes.

The pH of the washing solution used during washing may be in the range within which the suspension agent can be removed, and is preferably a pH of 1 to 12.

If performing acid cleaning, from the perspective of removal efficiency of the suspension agent and the color hue of the obtained copolymer, the pH is preferably 1 to 5, and more preferably 1.2 to 4. Acids that are used in this operation are not especially limited, as long as the suspension agent can be removed. For example, conventionally-known inorganic acids and organic acids may be used. Examples of inorganic acids that may be suitably used include hydrochloric acid, nitric acid, sulfuric acid, phosphoric acid, and boric acid. Dilute solutions of these acids, which are diluted with water or the like, may also be used. Examples of organic acids include acids having a carboxyl group, a sulfo group, a hydroxy group, a thiol group, and an enol. Considering the removal efficiency of the suspension agent and the color hue of the obtained resin, more preferred are sulfuric acid, nitric acid, and an organic acid having a carboxyl group.

After the acid cleaning, from the perspective of the color hue of the obtained polymer and reduction of the repose angle, it is preferred to further carry out water washing or alkali cleaning.

The pH of the alkali solution when performing alkali cleaning is preferably 7.1 to 12, more preferably 7.5 to 11, and still more preferably 7.5 to 10.5.

Examples of the alkaline component suitably used in alkaline cleaning include, but are not limited to, a tetraalkylammonium hydroxide, an alkali metal hydroxide, and an alkaline earth metal hydroxide. More suitable are an alkali metal hydroxide and an alkaline earth metal hydroxide. Still more preferred are lithium hydroxide, sodium hydroxide, potassium hydroxide, rubidium hydroxide, cesium hydroxide, magnesium hydroxide, calcium hydroxide, and barium hydroxide. Even more preferred are lithium hydroxide, sodium hydroxide, potassium hydroxide, magnesium hydroxide, and calcium hydroxide. Still even more preferred are sodium hydroxide and potassium hydroxide.

These alkaline components can be used by diluting with water or the like to adjust the pH.

<Dewatering Step>

As a method for separating the polymer particles from the obtained polymer slurry of the methacrylic-based resin, a conventionally-known method can be applied.

Examples may include a dewatering method that uses a centrifugal separator which utilizes centrifugal force to shake out water, and a method that separates the polymer particles by suction removal of water on a porous belt or a filtration membrane.

<Drying Step>

The methacrylic-based resin (I) obtained after the above-described dewatering step, which still contains water, may be subjected to a drying treatment by a known method, and then recovered.

Examples of such a method may include hot-air drying in which drying is carried out by blowing hot air into a tank from a hot-air drier, a blow heater, or the like, vacuum drying in which drying is carried out by reducing the pressure in the system and increasing the temperature as necessary, barrel drying in which moisture is thrown off by rotating the obtained polymer in a vessel, and spin drying in which drying is carried out by utilizing centrifugal force.

These methods may be used singly or in combinations of two or more thereof.

The moisture content of the obtained methacrylic-based resin (I) is, considering the handleability, color hue, and the like of the obtained methacrylic-based resin (I), preferably 0.01% by mass to 1% by mass, more preferably 0.05% by mass to 1% by mass, still more preferably 0.1% by mass to 1% by mass, and even more preferably 0.27% by mass to 1% by mass. The moisture content of the obtained methacrylic-based resin (I) can be measured using the Karl Fischer method.

When producing the methacrylic-based resin (I) using the above-described suspension polymerization method, although the obtained methacrylic-based resin is usually roughly spherical, agglomerates can sometimes be formed.

The term "agglomerates" refers to residual matter remaining on a sieve having a mesh of 1.68 mm when the obtained polymer is passed through the sieve.

If agglomerates remain in the methacrylic-based resin (I), the color hue of the obtained methacrylic-based resin (I) tends to deteriorate. It is preferred that the amount of agglomerates in the methacrylic-based resin (I) is 1.2% by mass or less, and more preferred is 1.0% by mass or less.

The agglomerate content can be calculated by measuring the weight of matter remaining on a sieve having a mesh of 1.68 mm after passing the obtained polymer through the sieve after drying in an drying oven at 80° C. for 12 hours, and dividing the obtained weight by the total weight of the raw materials to obtain the amount of agglomerate produced (% by mass).

Considering workability during molding and extrusion and the like, it is preferred that the methacrylic-based resin (I) obtained using the above-described suspension polymerization method has an average particle size of 0.1 mm or more. Considering also the color hue of the molded object, more preferred is 0.1 mm or more and 1 mm or less, even more preferred is 0.1 mm or more and 0.5 mm or less, and still even more preferred is 0.1 mm or more and 0.4 mm or less.

The average particle size can be measured in accordance with, for example, JIS-Z8801, by, using the sieves (JTS-200-45-44 (500 μm apertures), 34 (425 μm apertures), 35 (355 μm apertures), 36 (300 μm apertures), 37 (250 μm apertures), 38 (150 μm apertures), and 61 (pan) manufactured by Tokyo Screen Co., Ltd.), measuring the weight of particles remaining on each sieve after carrying out sieving operation for 10 minutes at maximum vibration output using a test sieve shaker TSK B-1, and determining the particle size at which cumulative weight is 50%.

In the polymerization step in the various polymerization methods of producing the methacrylic-based resin (I) included in the vehicle part cover according to the present embodiment, namely, the polymerization step in a bulk polymerization method, solution polymerization method, suspension polymerization method, and emulsion polymerization method, a polymerization initiator may be used to adjust the degree of polymerization of the polymer to be produced.

When performing radical polymerization, examples of the above-described polymerization initiator include, but are not limited to, organic peroxides, such as di-t-butyl peroxide, lauroyl peroxide, stearyl peroxide, benzoyl peroxide, t-butyl peroxyneodecanate, t-butyl peroxypivalate, dilauroyl peroxide, dicumyl peroxide, t-butyl peroxy-2-ethylhexanoate, 1,1-bis(t-butylperoxy)-3,3,5-trimethylcyclohexane, and 1,1-bis(t-butylperoxy)cyclohexane, and azo-based common radical polymerization initiators, such as azobisisobutyronitrile, azobisisovaleronitrile, 1,1-azobis(1-cyclohexanecarbonitrile), 2,2'-azobis-4-methoxy-2,4-azobisisobutyronitrile, 2,2'-azobis-2,4-dimethylvaleronitrile, and 2,2'-azobis-2-methylbutyronitrile.

These can be used singly or in combinations of two or more thereof.

These radial polymerization initiators may also be used as a redox initiator by combining with an appropriate reducing agent.

These polymerization initiators are typically used in the range of 0 to 1 part by mass based on a total of 100 parts by mass of all the monomers to be used. However, the amount may be appropriately selected in consideration of the temperature at which polymerization is to be carried out and the half-life of the initiator.

When selecting a bulk polymerization method, a cast polymerization method, or a suspension polymerization method, from the perspective of preventing coloration of the methacrylic-based resin, it is especially suitable to use a peroxide initiator, such as lauroyl peroxide, decanoyl peroxide, and t-butylperoxy-2-ethylhexanoate, and it is more especially suitable to use lauroyl peroxide.

Further, when performing a solution polymerization method or bulk polymerization at a high temperature of 90° C. or more, a peroxide or azobis initiator, for example, which has a 10 hour half-life temperature of 80° C. or more and is soluble in the organic solvent to be used, is preferred. Examples of such a polymerization initiator include, but are not limited to, 1,1-bis(t-butylperoxy)-3,3,5-trimethylcyclohexane, cyclohexane peroxide, 2,5-dimethyl-2,5-di(benzoylperoxy)hexane, 1,1-azobis(2-cyclohexanecarbonitrile), and 2-(carbamoylazo)isobutyronitrile.

It is preferred to use these polymerization initiators in a range of, for example, 0 to 1 part by mass based on a total of 100 parts by mass of all the monomers to be used.

In the production step of methacrylic-based resin (I) included in the vehicle part cover according to the present embodiment, to the extent that the object of the present invention is not harmed, the molecular weight of the polymer to be produced can be controlled.

For example, the molecular weight can be controlled by using, for example, a chain transfer agent, such as an alkyl mercaptans, dimethylacetamide, dimethylformamide, and triethylamine, and an iniferter, such as dithiocarbamates, triphenylmethylazobenzene, and a tetraphenylethane derivative. In addition, the molecular weight can be controlled by adjusting the amount of the chain transfer agent and iniferter to be added.

If these chain transfer agents and iniferters are used, from the perspectives of handleability and stability, an alkyl mercaptans is suitably used. Examples thereof include, but are not limited to, n-butyl mercaptan, n-octyl mercaptan, n-dodecyl mercaptan, t-dodecyl mercaptan, n-tetradecyl mercaptan, n-octadecyl mercaptan, 2-ethylhexyl thioglycolate, ethylene glycol dithioglycolate, trimethylolpropane tris(thioglycolate), and pentaerythritol tetrakis(thioglycolate).

Although these may be appropriately added based on the required molecular weight, typically they are used in a range of 0.001 to 3 parts by mass based on a total of 100 parts by mass of all the monomers to be used.

Further, examples of other methods for controlling molecular weight include a method in which the polymerization method is changed, a method in which the amount of the polymerization initiator is adjusted, and a method in which the polymerization temperature is changed.

These molecular weight control methods can be used singly or in combinations of two or more thereof.

(Methacrylic-Based Resin (II))

The vehicle part cover according to the present embodiment may further include, in addition to the above-described methacrylic-based resin (I), a methacrylic-based resin (II) which includes at least 80 to 99.5% by mass of a methacrylate monomer unit (A'), and has a weight average molecular weight measured by gel permeation chromatography (GPC) of 20,000 to 300,000.

In this case, from the perspective of color hue, it is preferred that the vehicle part cover according to the present embodiment includes 10 to 99% by mass of the methacrylic-based resin (I) and 90 to 1% by mass of the methacrylic-based resin (II), more preferred is 15 to 95% by mass of the methacrylic-based resin (I) and 85 to 5% by mass of the methacrylic-based resin (II), and even more preferred is 20 to 80% by mass of the methacrylic-based resin (I) and 80 to 20% by mass of the methacrylic-based resin (II).

When using the methacrylic-based resin (II), which is different from the methacrylic-based resin (I), for the vehicle part cover according to the present embodiment along with the methacrylic-based resin (I), a monomer represented by the following general formula (9) is suitably used as the methacrylate monomer unit (A') constituting the methacrylic-based resin (II).

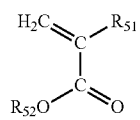

(9)

In the above formula, $R_{51}$ represents a methyl group.

Further, $R_{52}$ represents a group having 1 to 12 carbon atoms, preferably a hydrocarbon group having 1 to 12 carbon atoms, and may have a hydroxyl group on a carbon.

Examples of the methacrylate monomer (A') represented by general formula (9) include, but are not limited to, butyl methacrylate, ethyl methacrylate, methyl methacrylate, propyl methacrylate, isopropyl methacrylate, cyclohexyl methacrylate, phenyl methacrylate, (2-ethylhexyl) methacrylate, (t-butyl cyclohexyl) methacrylate, cyclohexyl methacrylate, phenyl methacrylate, benzyl methacrylate, and (2,2,2-trifluoroethyl) methacrylate. From the perspective of availability and the like, methyl methacrylate is preferred.

The above-described methacrylate monomers may be used singly or in combinations of two or more thereof.

Considering the balance among heat resistance, thermal stability, and fluidity, the content of the above-described methacrylate monomer unit (A') in the methacrylic-based resin (II) is 80 to 99.5% by mass, preferably 85 to 99.5% by mass, more preferably 90 to 99% by mass, even more preferably 92 to 99.3% by mass, still even more preferably 92 to 99% by mass, and yet still even more preferably 94 to 99% by mass.

The above-described methacrylic-based resin (II) includes the above-described methacrylate monomer unit (A') and another vinyl monomer unit (C') that is copolymerizable with (A').

Examples of the monomer used for forming the above-described another vinyl monomer unit (C') that is copolymerizable with (A') included in the above-described methacrylic-based resin (II) include, but are not limited to, acrylate monomers represented by the following general formula (1):

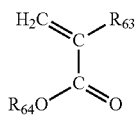

(10)

wherein, $R_{63}$ is a hydrogen atom, and $R_{64}$ is an alkyl group having 1 to 18 carbon atoms; α,β-unsaturated acids, such as acrylic acid and methacrylic acid; divalent carboxylic acids containing an unsaturated group and alkyl esters thereof, such as maleic acid, fumaric acid, itaconic acid, and cinnamic acid; styrene-based monomers, such as styrene, o-methylstyrene, m-methylstyrene, p-methylstyrene, 2,4-dimethylstyrene, 2,5-dimethylstyrene, 3,4-dimethylstyrene, 3,5-dimethylstyrene, p-ethylstyrene, m-ethylstyrene, o-ethylstyrene, p-tert-butylstyrene, and isopropylbenzene (α-methylstyrene); aromatic vinyl monomers, such as 1-vinylnaphthalene, 2-vinylnaphthalene, 1,1-diphenylethylene, isopropenyltoluene, isopropenylethylbenzene, isopropenylpropylbenzene, isopropenylbutylbenzene, isopropenylpentylbenzene, isopropenylhexylbenzene, and isopropenyloctylbenzene; vinyl cyanide monomers, such as acrylonitrile and methacrylonitrile; maleimides and N-substituted maleimides, such as N-methylmaleimide, N-ethylmaleimide, N-phenylmaleimide, and N-cyclohexylmaleimide; amides, such as acrylamide and methacrylamide; compounds formed by esterification of both end hydroxyl groups of an ethyleneglycol or an oligomer thereof with acrylic acid or methacrylic acid, such as ethyleneglycol di(meth)acrylate, diethyleneglycol di(meth)acrylate, triethyleneglycol di(meth)acrylate, and tetraethyleneglycol di(meth)acrylate; compounds formed by esterification of hydroxyl groups of dihydroxyl alcohol with acrylic acid or methacrylic acid, such as neopentylglycol di(meth)acrylate, di(meth)acrylate, and the like; compounds formed by esterification of a polyhydric alcohol derivative such as trimethylolpropane and pentaerythritol with acrylic acid or methacrylic acid; and polyfunctional monomers such as divinylbenzene.

Especially, in the vehicle part cover according to the present embodiment, from the perspective of increasing weatherability, heat resistance, fluidity, and thermal stability, methyl acrylate, ethyl acrylate, n-propyl acrylate, n-butyl acrylate, sec-butyl acrylate, 2-ethylhexyl acrylate and the like are preferred, and more preferred are methyl acrylate, ethyl acrylate, and n-butyl acrylate. Further, from the perspective of availability, methyl acrylate and ethyl acrylate are still more preferred.

The above-described vinyl monomers may be used singly or in combinations of two or more thereof.

The amount of the monomer for forming the another vinyl monomer unit (C') that is copolymerizable with the methacrylate monomer unit (A') to be added in the above-described methacrylic-based resin (II) can be appropriately selected within a range in which the properties of the obtained methacrylic-based resin (II) are not harmed. From the perspectives of fluidity, heat resistance, and thermal stability, the amount to be added is, based on the 100% by mass of all the monomers constituting the methacrylic-based resin (II), 0.5 to 20% by mass, preferably 0.5 to 15% by mass, more preferably 0.5 to 10% by mass, still more preferably 0.7 to 8% by mass, even more preferably 1 to 8% by mass, and still even more preferably 1 to 6% by mass.

<Weight Average Molecular Weight, Number Average Molecular Weight Etc. of Methacrylic-Based Resin (II)>

The weight average molecular weight and the number average molecular weight of the methacrylic-based resin (II) can be measured by gel permeation chromatography (GPC).

Specifically, a calibration curve is plotted in advance from elution times and the weight average molecular weights of standard methacrylic resins that can be obtained as monodisperse reagents having a known weight average molecular weights, number average molecular weights, and peak molecular weights, by using an analysis gel column that elutes a high molecular weight component first.

Next, based on the obtained calibration curve, the weight average molecular weight, number average molecular weight, and peak molecular weight of a specimen of the methacrylic-based resin, which is the measurement target, can be determined.

Considering the heat resistance, processing fluidity, and thermal stability of methacrylic-based resin, the weight average molecular weight of the methacrylic-based resin (II) may be appropriately selected so that a desired heat resistance, fluidity, and thermal stability are obtained. However, it is preferred that the weight average molecular weight is 20,00 to 300,000, more preferably 20,000 to 250,000, even more preferably 50,000 to 250,000, and especially preferably 70,000 to 230,000.

Further, although the molecular weight distribution (Mw/Mn) may be appropriately selected in consideration of a balance between properties such as fluidity and mechanical properties, it is preferred that the molecular weight distribution is 1.5 to 7, more preferably 1.5 to 5, and even more preferably 1.5 to 4.

Note that from the perspectives of mechanical strength, solvent resistance, and fluidity, it is preferred that the weight average molecular weight of the mixed methacrylic-based resin of the above-described methacrylic-based resin (I) and the methacrylic-based resin (II) is 65,000 or more and 300,000 or less, more preferably 65,000 or more and 250,000 or less, and even more preferably 70,000 or more and 230,000 or less.

(Method of Producing Methacrylic-Based Resin (II))

The methacrylic-based resin (II) can be produced based on a bulk polymerization method, solution polymerization method, suspension polymerization method, sedimentation polymerization method, and emulsion polymerization method using a methacrylate monomer (A') and another vinyl monomer unit (C') that is copolymerizable with the methacrylate monomer. It is preferred to use a bulk polymerization method, solution polymerization method, or suspension polymerization method, more preferred to use a solution polymerization method or suspension polymerization method, and still more preferred to use a suspension polymerization method.

As specific methods, the same methods described as the method of producing the above-described methacrylic-based resin (I) can be employed.

(Methacrylic-Based Resin Composition)

The vehicle part cover according to the present embodiment can be also produced using a methacrylic-based resin composition, which is a mixture of the above-described methacrylic-based resin (I), the methacrylic-based resin (II) used as required, as well as the below-described predetermined another resin, and predetermined additives.

Note that the methacrylic-based resin included in the vehicle part cover according to the present embodiment is only the methacrylic-based resin (I) in some cases, while in other cases the methacrylic-based resin includes the methacrylic-based resin (I) and the methacrylic-based resin (II). However, both cases may be collectively referred to simply as "methacrylic-based resin" in the following.

<Another Resin>

As the another resin to be combined with the above-described methacrylic-based resin, a known thermoplastic resin can be used as long as such a resin can exhibit the properties that are required for the vehicle part cover.

Examples of the above-described thermoplastic resin include, but are not limited to, a polyalkylene arylate-based resin, such as polypropylene-based resin, polyethylene-based resin, polystyrene-based resin, a syndiotactic polystyrene-based resin, polycarbonate-based resin, ABS-based resin, acrylic-based resin, AS-based resin, BAAS-based resin, MBS resin, AAS resin, a biodegradable resin, an alloy of polycarbonate-ABS resin, polybutylene terephthalate, polyethylene terephthalate, polypropylene terephthalate, polytrimethylene terephthalate, and polyethylene naphthalate; polyamide-based resin, polyphenylene ether-based resin, polyphenylene sulfide-based resin, and phenol-based resin.

Especially, from the perspective of improving fluidity, AS resin and BAAS resin are preferred, and from the perspective of improving impact resistance, ABS resin and MS resin are preferred.

Further, from the perspective of improving flame resistance, polyphenylene ether resin, polyphenylene sulfide resin, phenol resin, and the like are preferred.

If heat resistance or impact resistance need to be imparted, or optical properties are required to be adjusted, polycarbonate resin is preferred.

In addition, acrylic-based resin, which has good compatibility with the above-described methacrylic-based resin, is preferred when adjusting properties such as fluidity and impact resistance while maintaining transparency.

The above-described various thermoplastic resins can be used singly or in combinations of two or more thereof.

In the vehicle part cover according to the present embodiment, when the above-described methacrylic-based resin and the above-described another resin are used in combination, the blending ratio of these components may be within a range in which the effects of the present invention are exhibited. However, considering the effect of imparting the properties, based on 100% by mass of the total amount of the above-described methacrylic-based resins (I) and (II) and the another resin, it is preferred that the blending ratio of the another resin is 50% by mass or less, more preferably 45% by mass or less, even more preferably 40% by mass or less, still even more preferably 30% by mass or less, and yet still even more preferably 20% by mass or less.

Further, considering the effect of imparting the properties when blending another resin, the lower limit value of the amount of another resin to be blended is 0.1% by mass or more, more preferably 1% by mass or more, even more preferably 2% by mass or more, still even more preferably 3% by mass or more, and yet still even more preferably 5% by mass or more.

The type and content of the another resin can be appropriately selected based on the expected effects when using the another resin in combination.

<Additives>

A predetermined additive may be added to the methacrylic-based resin to be used in the vehicle part cover according to the present embodiment to impart various properties, such as rigidity and dimensional stability.

Examples of the additive include, but are not limited to, various stabilizers, such as a UV absorber, a thermal stabilizer, and a light stabilizer; a plasticizer (paraffin-based process oil, naphthene-based process oil, aromatic series process oil, paraffin, an organic polysiloxane, a mineral oil), a flame retardant (e.g., phosphorus-based flame retardants such as an organophosphate compound, red phosphorus, and an inorganic phosphate, halogen-based flame retardants, silica-based flame retardants, silicone-based flame retardants), a flame retardant auxiliary agent (e.g., antimony oxide, a metal oxide, a metal hydroxide), a curing agent (amines, such as diethylenetriamine, triethylenetetramine, tetraethylenepentamine, pentaethylenehexamine, diethylaminopropylamine, 3,9-bis(3-aminopropyl)-2,4,8,10-tetraoxaspiro[5,5]undecane, menthenediamine, isophoronediamine, N-aminoethylpiperazine, m-xylenediamine, m-phenylenediamine, diaminophenylmethane, diaminodiphenylsulfone, dicyandiamide, and dihydrazide adipate, phenol resins, such as phenol novolak resin and cresol novolak resin, polymercaptans, such as liquefied polymercaptan and polysulfide, and acid anhydrides, such as phthalic anhydride, tetrahydrophthalic anhydride, hexahydrophthalic anhydride, methyltetrahydrophthalic anhydride, methylhexahydrophthalic anhydride, methylnadic anhydride, pyromellitic anhydride, methylcyclohexene tetracarboxylic anhydride, dodecylsuccinic anhydride, trimellitic anhydride, chlorendic anhydride, benzophenonetetracarboxylic anhydride, and ethyleneglycol bis(anhydrotrimellitate)), a curing accelerator (imidazoles such as 2-methylimidazole, 2-ethylimidazole, 2-ethyl-4-methylimidazole, 2-phenylimidazole, 2-undecylimidazole, 2-heptadecylimidazole, and 2-phenyl-4-methylimidazole, organic phosphines such as triphenyl phosphine and tributyl phosphine, tertiary amines such as benzyldimethylamine, 2-dimethylaminomethyl)phenol, 2,4,6-tris(diaminomethyl) phenol, and tetramethylhexanediamine, boron salts such as triphenylphosphine tetraphenylborate, tetraphenylphosphonium tetraphenylborate, and triethylamine tetraphenylborate, and quinoid compounds such as 1,4-benzoquinone, 1,4-naphthoquinone, 2,3-dimethyl-1,4-benzoquinone, 2,6-dimethylbenzoquinone, and 2,3-dimethoxy-1,4-benzoquinone), an antistatic agent (e.g., a polyamide elastomer, a quaternary ammonium salt, a pyridine derivative, an aliphatic sulfonate, an aromatic sulfonate, an aromatic sulfonate copolymer, a sulfate, a polyhydric alcohol partial ester, alkyl diethanolamine, alkyl diethanolamide, a polyalkylene glycol derivative, a betaine, and an imidazoline derivative), a conductivity imparting agent, a stress relaxation agent, a mold release (alcohol, an ester of alcohol and a fatty acid, an ester of alcohol and a dicarboxylic acid, silicone oil, and the like), a crystallization promoter, a hydrolysis inhibitor, a lubricant (e.g., a higher fatty acid such as stearic acid, behenic acid, zinc stearate, calcium stearate, and magnesium stearate, as well as a metal salt of those, and a higher fatty acid amide such as ethylene bis-stearamide), an impact resistance imparting agent, a slidability improving agent (a hydrocarbon such as low molecular weight polyethylene, a higher alcohol, a polyhydric alcohol, polyglycol, polyglycerol, a higher fatty acid, a higher fatty acid metal salt, a fatty acid amide, an ester of a fatty acid and a fatty alcohol, a full ester or a partial ester of a fatty acid and a polyhydric alcohol, a full ester or a partial ester of a fatty acid and polyglycol, a silicon-based agent, a fluororesin etc.), a compatibilizer, a nucleating agent, a reinforcing agent such as a filler, a flow regulator, a dye (nitroso dye, nitro dye, azo dye, stilbene azo dye, ketoimine dye, triphenylmethane dye, xanthene dye, acridine dye, quinoline dye, methine/polymethine dye, thiazole dye, indamine/indophenol dye, azine dye, oxazine dye, thiazine dye, sulfide dye, aminoketone/oxyketone dye, anthraquinone dye, indigoid dye, phthalocyanine dye etc.), a sensitizer, a colorant (inorganic pigments such as titanium oxide, carbon black, titan yellow, iron oxide pigment, ultramarine, cobalt blue, chromium oxide, spinel green, lead chromate pigment, and cadmium pigment, organic pigments, such as an azo pigment such as azo lake pigment, a benzimidazolone pigment, a diarylide pigment, and a condensed azo pigment, a phthalocyanine pigment such as Phthalocyanine Blue and Phthalocyanine Green, and a condensed polycyclic pigment such as an isoindolinone pigment, a quinophthalone pigment, a quinacridone pigment, a perylene pigment, an anthraquinone pigment, a perinone pigment, and dioxazine violet, and a metallic pigment such as a metallic pigment of a piece of scale-like aluminum, a spherical aluminum pigment used to improve an weld appearance, mica powder for pearl tone metallic pigment, and other metallic pigments coated by metal plating or sputtering on the polyhedron particles of an inorganic substance such as glass, etc.), a thickening agent, an antisettling agent, a drip inhibitor, a bulking agent (fibrous strengthening agents such as glass fiber and carbon fiber, and also glass beads, calcium carbonate, talc, clay etc.), a defoaming agent (organic defoaming agents such as a silicone defoaming agent, a surface-active agent, polyether, and a higher alcohol, etc.), a coupling agent, light-diffusing fine particles, an anti-rust agent, an anti-fungus/anti-mildew agent, an anti-stain agent, a conductive polymer, and a rubber polymer.

Examples of the above-described light-diffusing fine particles include, but are not limited to, inorganic fine particles such as alumina, titanium oxide, calcium carbonate, barium sulfate, silicon dioxide, and glass beads, and organic fine particles such as styrene crosslinked beads, MS crosslinked beads, and siloxane crosslinked beads.

Further, hollow cross-linked fine particles formed from a highly transparent resin material, such as acrylic resin, polycarbonate resin, MS resin, and a cyclic olefin resin, hollow fine particles formed of glass, and the like can also be used as the light-diffusing fine particles.

From the perspective of diffusion properties and availability, alumina, titanium oxide, and the like are more preferred as the above-described inorganic fine particles.

Further, the light-diffusing fine particles can be used singly or in combinations of two or more thereof.

Here, it is preferred that the light-diffusing fine particles have a refractive index of 1.3 to 3.0, more preferred is 1.3 to 2.5, and even more preferred is 1.3 to 2.0.

If the refractive index is 1.3 or more, scattering properties that are sufficient in practice are obtained. If the refractive index is 3.0 or less, when the vehicle part cover according to the present embodiment is used for a part near a lamp, scattering near the lamp is suppressed, and luminance unevenness and color unevenness of the output light can be effectively prevented.

The above-described refractive index is a value at a temperature of 20° C. based on D-rays (589 nm).

Examples of the method of measuring the refractive index of the light-diffusing fine particles include a method comprising the steps of: immersing the light-diffusing fine particles in a liquid whose refractive index can be gradually changed; observing the interface of the light-diffusing fine particles while changing the refractive index of the liquid; and measuring the refractive index of the liquid when the interface of the light-diffusing fine particles become indistinct. An Abbe refractometer and the like can be used for measurement of the refractive index of the liquid.

Further, it is preferred that the above-described light-diffusing fine particles have an average particle size of 0.1 to 20 μm, more preferred is 0.2 to 15 μm, even more preferred is 0.3 to 10 μm, and still even more preferred is 0.4 to 5 μm.

It is preferred that the average particle size is 20 μm or less, because light loss due to back reflection and the like is suppressed, and incident light can be efficiently diffused to the light-emitting face side. Further, it is preferred that the average particle size is 0.1 μm or more, because the output light can be diffused, and the desired surface emission luminance and diffusion properties can be obtained.

Further, from the perspectives of exhibiting a light diffusion effect and uniformity of surface emission, it is preferred that the content of the light-diffusing fine particles in the methacrylic-based resin composition is, based on 100 parts by mass of the methacrylic-based resin, 0.0001 to 0.03 parts by mass, and more preferred is 0.0001 to 0.01 parts by mass.

Examples of the above-described thermal stabilizer include, but are not limited to, hindered phenol antioxidants and phosphorus-based antioxidants. From the perspective of imparting thermal stability to the resin, a hindered phenol antioxidant is preferred.

When producing a long molded object, such as a meter cover or a tail lamp cover, as the vehicle part cover according to the present embodiment, if a volatile component is included, a weld line tends to appear during molding. Therefore, from the perspectives of suppressing weld lines and suppressing silver streaks, it is preferred that the vapor pressure (P) at 20° C. of the thermal stabilizer is $1.0 \times 10^{-4}$ Pa or less, more preferred is $1.0 \times 10^{-5}$ Pa or less, and even more preferred is $1.0 \times 10^{-6}$ Pa or less.

The content of the thermal stabilizer may be an amount that is sufficient to exhibit the effects of the present invention. If the content is too high, problems such as bleed out may occur during processing. Therefore, it is preferred that the content of the thermal stabilizer is, based on 100 parts by mass of the methacrylic-based resin, 5 parts by mass or less, more preferred is 3 parts by mass or less, even more preferred is 1 part by mass or less, still even more preferred is 0.8 parts by mass or less, yet still even more preferred is 0.01 parts by mass or more and 0.8 parts by mass or less, and especially preferred is 0.01 parts by mass or more and less than 0.5 parts by mass.

Examples of the thermal stabilizer include, but are not limited to, pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, 3,3',3",5,5',5"-hexa-tert-butyl-a,a',a"-(mesitylene-2,4,6-triyl)tri-p-cresol, 4,6-bis(octylthiomethyl)-o-cresol, 4,6-bis(dodecylthiomethyl)-o-cresol, ethylene bis(oxyethylene)bis[3-(5-tert-butyl-4-hydroxy-m-tolyl)propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylene)methyl]-1,3,5-triazine-2,4,6(1H,3H,5H)-trione, 2,6-di-tert-butyl-4-(4,6-bis(octylthio)-1,3,5-triazine-2-ylamine)phenol, 2-[1-(2-hydroxy-3,5-di-tert-pentylphenyl)ethyl]-4,6-di-tert-pentylphenyl acrylate, and 2-tert-butyl-4-methyl-6-(2-hydroxy-3-tert-butyl-5-methylbenzyl)phenyl acrylate.

Especially, pentaerythritol tetrakis[3-(3,5-di-tert-butyl-4-hydroxyphenyl)propionate], octadecyl-3-(3,5-di-t-butyl-4-hydroxyphenyl)propionate, and 2-[1-(2-hydroxy-3,5-di-tert-pentylphenyl)ethyl]-4,6-di-tert-pentylphenyl acrylate are preferred.

Further, the hindered phenol antioxidant as the above-described thermal stabilizer may be a commercially-available phenol antioxidant. Examples of such a commercially-available phenol antioxidant include, but are not limited to, Irganox 1010 (pentaerythritol tetrakis[3-(3,5-di-t-butyl-4-hydroxyphenyl)propionate], manufactured by Ciba Specialty Chemicals Inc.), Irganox 1076 (octadecyl-3-(3,5-di-t-butyl-4-hydroxyphenyl)propionate, manufactured by Ciba Specialty Chemicals Inc.), Irganox 1330 (3,3',3",5,5',5"-hexa-t-butyl-a,a',a"-(mesitylene-2,4,6-triyl)tri-p-cresol, manufactured by Ciba Specialty Chemicals Inc.), Irganox 3114 (1,3,5-tris(3,5-di-t-butyl-4-hydroxybenzyl)-1,3,5-triazine-2,4,6(1H,3H,5H)-trione, manufactured by Ciba Specialty Chemicals Inc.), Irganox 3125 (manufactured by Ciba Specialty Chemicals Inc.), Sumilizer BHT (manufactured by Sumitomo Chemical Co., Ltd.), Cyanox 1790 (manufactured by Cytec Industries Inc.), Sumilizer GA-80 (manufactured by Sumitomo Chemical Co., Ltd.), Sumilizer GS (2-[1-(2-hydroxy-3,5-di-tert-pentylphenyl)ethyl]-4,6-di-tert-pentylphenyl acrylate, manufactured by Sumitomo Chemical Co., Ltd.), Sumilizer GM (2-tert-butyl-4-methyl-6-(2-hydroxy-3-tert-butyl-5-methylbenzyl)phenyl acrylate, manufactured by Sumitomo Chemical Co., Ltd.), and vitamin E (manufactured by Eisai Co., Ltd.).

From the perspective of the effect of imparting thermal stability to this resin, among these commercially-available phenol antioxidants, preferred are Irganox 1010, Irganox 1076, Sumilizer GS, and the like. These can be used singly or in combinations of two or more thereof.

Further, examples of the phosphorous-based antioxidant as the above-described thermal stabilizer include, but are not limited to, tris(2,4-di-t-butylphenyl)phosphite, bis(2,4-bis(1,1-dimethylethyl)-6-methylphenyl)ethyl ester phosphorous acid, tetrakis(2,4-di-t-butylphenyl)(1,1-biphenyl)-4,4'-diyl bisphosphonite, bis(2,4-di-t-butylphenyl)pentaerythritol diphosphite, bis(2,6-di-t-butyl-4-methylphenyl)pentaerythritol diphosphite, bis(2,4-dicumylphenyl)pentaerythritol diphosphite, tetrakis(2,4-t-butylphenyl)(1,1-biphenyl)-4,4'-diyl bisphosphonite, di-t-butyl-m-cresyl-phosphonite, and 4-[3-[(2,4,8,10-tetra-tert-butyldibenzo[d,f][1,3,2]dioxaphosphepin)-6-yloxy]propyl]-2-methyl-6-tert-butylphenol.

In addition, a commercially-available phosphorous-based antioxidant may be used as the phosphorous-based antioxidant. Examples of such a commercially-available phosphorous-based antioxidant include, but are not limited to, Irgafos 168 (tris(2,4-di-t-butylphenyl)phosphite, manufactured by Ciba Specialty Chemicals Inc.), Irgafos 12 (tris[2-[[2,4,8,10-tetra-t-butyldibenzo[d,f][1,3,2]dioxaphosphepin)-6-yl]oxy]ethyl]amine, manufactured by Ciba Specialty Chemicals Inc.), Irgafos 38 (ethylbis(2,4-di-tert-butyl-6-methylphenyl)phosphite, manufactured by Ciba Specialty Chemicals Inc.), ADEKA STAB 329K (ADK STAB 329K, manufactured by ADEKA Corporation), ADEKA STAB PEP36 (ADK STAB PEP36, manufactured by ADEKA Corporation), ADEKA STAB PEP-8 (ADK STAB PEP-8, manufactured by ADEKA Corporation), Sandstab P-EPQ (manufactured by Clariant International Ltd.), Weston 618

(manufactured by General Electric Company), Weston 619G (manufactured by General Electric Company), Ultranox 626 (manufactured by General Electric Company), and Sumilizer GP (4-[3-[(2,4,8,10-tetra-tert-butyldibenzo[d,f][1,3,2] dioxaphosphepin)-6-yloxy]propyl]-2-methyl-6-tert-butylphenol, manufactured by Sumitomo Chemical Co., Ltd.).

These phosphorous-based antioxidants can be used singly or in combinations of two or more thereof.

Further, to obtain thermal stability that is sufficiently excellent in practice, it is preferred that the content of the methacrylate monomer unit, the content of the structural unit (B) having a ring structure in its main chain, and the blending ratio (Y) of the thermal stabilizer satisfy the following formula (i), when a blending ratio of the thermal stabilizer based on 100 parts by mass of methacrylic-based resin is set as (Y)/parts by mass.

$$(Y) \geq 0.053 \times [\text{methacrylate monomer unit content}/(B) \text{ content}] - 0.4 \quad \text{(i)}$$

If the methacrylic-based resin included in the vehicle cover according to the present embodiment is only the above-described methacrylic-based resin (I), it is preferred that the following formula (i-1) is satisfied, and if the methacrylic-based resin included is a combination of said methacrylic-based resin (I) and methacrylic-based resin (II), it is preferred that the following formula (i-2) is satisfied.

$$(Y) \geq 0.053 \times [(A)\text{content}/(B)\text{content}] - 0.4 \quad \text{formula (i-1)}$$

$$(Y) \geq 0.053 \times [(A)+(A')\text{content}/(B)\text{content}] - 0.4 \quad \text{formula (i-2)}$$

As described above, the methacrylic-based resin (I) used as the material of the vehicle part cover according to the present embodiment includes the structural unit (B) having a ring structure in its main chain.

By including this structural unit (B) having a ring structure in its main chain, thermal degradation of this methacrylic-based resin when exposed to high temperature conditions, such as during molding of the methacrylic-based resin, is suppressed, and thus generation of volatile components can be reduced.

Namely, by increasing the content of the structural unit (B) having a ring structure in its main chain with respect to the methacrylate monomer unit (A), the additive amount of the above-described thermal stabilizer can be reduced.

On the other hand, if the ratio of the methacrylate monomer unit (A) with respect to the content of the above-described structural unit (B) having a ring structure in its main chain is high, thermal degradation of the methacrylic-based resin proceeds, and to make up for this the additive amount of the thermal stabilizer has to be increased.

As a result of investigating the relationship between MMA/MI (corresponding to (A) content/(B) content) and the amount of thermal stabilizer that is required to obtain excellent thermal stability in practice by using the methyl methacrylate (MMA) and the maleimide-based structural unit (MI) described in the below-described Examples, the equation in the above-described formula (i) was derived. And it was found that thermal stability that is sufficiently excellent in practice can be obtained by the amounts of the methacrylic-based resin (I) and the thermal stabilizer satisfying the above-described formula (i).

The expression "thermal stability that is excellent in practice" as used herein means, as described in the below-described Examples, the loss of mass caused by degradation of the methacrylic-based resin when held for 30 minutes at 290° C. is 6% or less.

If the thermal stabilizer is contained so as to satisfy the above-described formula (i), thermal stability that is excellent in practice is obtained, and excessive blending of the thermal stabilizer can also be prevented.

From the perspective of obtaining a high thermal stability, it is more preferred that $(Y) \geq 0.053 \times [\text{methacrylate monomer unit content}/(B) \text{ content}] - 0.35$, even more preferred that $(Y) \geq 0.053 \times [\text{methacrylate monomer unit content}/(B) \text{ content}] - 0.3$, and still even more preferred that $(Y) \geq 0.053 \times [\text{methacrylate monomer unit content}/(B) \text{ content}] - 0.25$.

Within the above-described range, the high thermal stability suitable for a vehicle part cover can be maintained.

Examples of the above-described UV absorber include, but are not limited to, benzotriazole compounds, benzotriazine compounds, benzoate compounds, benzophenone compounds, oxybenzophenone compounds, phenolic compounds, oxazole compounds, malonate compounds, cyanoacrylate compounds, lactone compounds, salicylate compounds, and benzoxazinone compounds.

Especially, from the perspective of compatibility with the resin, preferred are benzotriazole-based compounds and benzotriazine-based compounds. These may be used singly or in combinations of two or more thereof.

From the perspective of obtaining good molding processability of the methacrylic-based resin composition, it is preferred that the vapor pressure (P) at 20° C. of the UV absorber is $1.0 \times 10^{-4}$ Pa or less, more preferred is $1.0 \times 10^{-6}$ Pa or less, and even more preferred is $1.0 \times 10^{-8}$ Pa or less.

Here, the expression good molding processability means that there is little adhesion of low-molecular-weight compounds to the roll during molding of the resin into a film, for example. If low-molecular-weight compounds adhere to the roll, the low-molecular-weight compounds adhere back on to the surface of the molded object, which deteriorate the appearance and optical properties. Consequently, it is preferred that the above-described vapor pressure (P) value is satisfied to obtain good molding processability.

Further, it is preferred that the above-described UV absorber has a melting point (Tm) of 80° C. or more, more preferred is 100° C. or more, even more preferred is 130° C. or more, and still even more preferred is 160° C. or more.

It is preferred that the UV absorber has a weight loss rate when the temperature is increased from 23° C. to 260° C. at a rate of 20° C./min of 50% or less, more preferred is 30% or less, even more preferred is 15% or less, still even more preferred is 10% or less, and yet still even more preferred is 5% or less.

The above-described UV absorber can be blended in an amount that exhibits the effects of the present invention. If the UV absorber is added in an excessively large amount, problems such as bleed out may occur during processing. Therefore, it is preferred that the additive amount of the UV absorber is, based on 100 parts by mass of the methacrylic-based resin, 5 parts by mass or less, more preferred is 3 parts by mass or less, even more preferred is 1 part by mass or less, still even more preferred is 0.8 parts by mass or less, and yet still even more preferred is 0.01 parts by mass or more and 0.8 parts by mass or less.

(Method of Processing Methacrylic-Based Resin and the Methacrylic-Based Resin Composition)

Examples of the method of processing the methacrylic-based resin, or of mixing the methacrylic-based resin with the various additives or another resin to produce the methacrylic-based resin composition, include a kneading method that uses a kneading machine, such as an extruder, a heated roll, a kneader, a roller mixer, and a Banbury mixer.

Among these, kneading with an extruder is preferred from a productivity perspective.

The kneading temperature may be set based on the polymer constituting the methacrylic-based resin and the preferred processing temperature of the another resin to be mixed. As a guide, this kneading temperature may be in the range of 140 to 300° C., and preferably in the range of 180 to 280° C.

[Method of Producing the Vehicle Part Cover]

The vehicle part cover can be obtained by molding the above-described methacrylic-based resin alone or by molding the above-described methacrylic-based resin composition that includes this methacrylic-based resin.

As the method of producing the vehicle part cover, a known method can be employed, such as injection molding, sheet molding, blow molding, injection blow molding, inflation molding, T-die molding, press molding, extrusion molding, and foam molding. A secondary processing molding method, such as compressed air molding and vacuum molding, may also be used.

Further, another example is a method that kneads and produces the methacrylic-based resin composition using a kneading machine, such as a heated roll, a kneader, a Banbury mixer, and an extruder, cools and mills the resin composition, and then performs molding by transfer molding, injection molding, compression molding, and the like.

[Properties as a Vehicle Part Cover]

A vehicle part cover is generally exposed to high-temperature, high-humidity conditions. Accordingly, a vehicle part cover needs to have excellent resistance to heat and moisture with which distortion due to high-temperature, high-humidity conditions is hardly ever seen. Further, due to demands for lighter weight, a molded object with thinner walls is required, and as a result of that, higher heat resistance and molding processability are required. Especially for vehicle exterior material applications, such as a tail lamp cover, a long molded object needs to be molded, and thus that higher heat resistance and molding processability is required.

Further, for a vehicle instrument cover and the like, visibility is also required.

When using a material having high birefringence in molding process, polarized light can be seen when the molded object is viewed through a polarizer. Therefore, especially when it is used as a vehicle instrument cover which may be viewed through a polarizer such as in sunglasses, the visibility may become low. To solve this problem, it is effective to increase the molding processing temperature to suppress the generation of polarized light, thereby improving visibility. However, at the same time, even when molding processing is carried out at a high temperature, silver streaks must not occur.

(Heat Resistance)

From the perspective of suppressing problems such as distortion of the molded object during actual use, it is preferred that the Vicat softening temperature of the vehicle part cover according to the present embodiment is 110° C. or more, more preferred is 112° C. or more, even more preferred is 113° C. or more, still even more preferred is 115° C. or more, yet still even more preferred is 117° C. or more, and especially preferred is 120° C. or more.

The Vicat softening temperature can be measured in accordance with ISO 306 B50. Specifically, Vicat softening temperature can be measured based on the method described in the below-described Examples.

(Transparency)

From the perspective of visibility, it is preferred that the vehicle part cover according to the present embodiment has a total light transmittance at a thickness of 3 mm of 70% or more, more preferred is 75% or more, and even more preferred is 80% or more.

Although a higher total light transmittance is preferred, in practice sufficient visibility can be obtained even at a total light transmittance of 94% or less.

Specifically, transparency can be measured by the method described in the below-described Examples.

Further, depending on the application, the vehicle part cover may also be colored. In this case, from the perspective of visibility, it is preferred that the total light transmittance at a thickness of 3 mm of 10% or more, more preferred is 15% or more, even more preferred is 20% or more, and still even more preferred is 25% or more.

The total light transmittance can be measured by the method described in the below-described Examples.

(Thickness)

The thickness of the vehicle part cover according to the present embodiment may be appropriately selected based on weight, strength, and molding processability. Specifically, it is preferred that the thickness is 0.1 to 5 mm, more preferred is 0.5 to 4 mm, even more preferred is 0.5 to 3 mm, and still even more preferred is 1 to 3 mm.

(Resistance to Heat and Moisture)

When using the vehicle part cover, depending on the conditions under which the vehicle is used, the vehicle part cover may be placed under high-temperature, high-humidity conditions. Especially, under an environment where a vehicle part cover tends to be exposed to direct sunlight, the vehicle part cover is subjected to high-temperature and high-humidity conditions, which may cause defects such as warping and distortion in a conventional methacrylic-based resin.

For the vehicle part cover according to the present embodiment, it is preferred that defects such as warping and distortion do not occur when it is left for 500 hours under conditions of a preset temperature of 90° C. and a preset humidity of 95% for an evaluation of resistance to heat and moisture.

Further, when used in applications such as an instrument cover and a tail lamp cover, visibility deteriorates if cloudiness is found after long exposure to high-temperature and high-humidity conditions. Therefore, it is preferred that the change in haze value before and after exposure to high-temperature and high-humidity conditions is small. Specifically, it is preferred that the degree of change in haze (haze value after the test—haze value before the test) (ΔHz) when left for 1,000 hours under conditions of a preset temperature of 80° C. and a preset humidity of 95% Rh is 1.3 or less, more preferred is 1.0 or less, even more preferred is 0.8 or less, still even more preferred is 0.7 or less, yet still even more preferred is 0.6 or less, and even yet still even more preferred is 0.5 or less.

Specifically, the resistance to heat and moisture, and the rate of change in haze can be measured by the method described in the below-described Examples.

(Scratch Resistance)

When the vehicle part cover is used in applications especially such as an instrument cover and a tail lamp cover, since visibility deteriorates if the surface is scratched, it is preferred that the vehicle part cover has high scratch resistance.

It is preferred that the vehicle part cover according to the present embodiment has a pencil hardness of H or more as a surface hardness.

Further, a vehicle part cover used inside a vehicle, such as for an instrument cover application, may be wiped with towel, tissue paper, and the like when dust is adhered to the vehicle part cover or the vehicle part cover is dirty. Therefore, it is preferred that, from practical perspective, the vehicle part cover is not easily scratched when its surface is wiped with tissue paper and the like.

Specifically, the scratch resistance of the vehicle part cover can be evaluated by the method described in the below-described Examples.

(Molding Processability)

Depending on the application, the vehicle part cover may be a molded object having a long shape. Therefore, it is preferred that the vehicle part cover has high molding fluidity.

Further, when a resin material having high birefringence is molded, a moire pattern may be observed due to distortion during molding when the molded object is viewed through a polarizing glass such as sunglass. Consequently, when used in an instrument cover application, the instrument installed under the cover is hard to see, and hence there is a need to solve the problem of distortion during molding.

As a method of improving the above-described molding fluidity and a method of solving the problem of molding distortion, a method can be employed that reduces the melt viscosity by increasing the molding temperature. However, if the molding temperature is increased, silvery traces called silver streaks may be produced in the molded object.

In addition, for a vehicle part cover application, there is a need to reduce wall thickness in order to reduce weight. To reduce the wall thickness of a molded object, although it is effective to increase fluidity by increasing the molding temperature as described above, if the molding temperature is increased, silver streaks may be produced.

Even when the methacrylic-based resin or methacrylic-based resin composition used to produce the vehicle part cover according to the present embodiment is molded with reduced melt viscosity by increasing the molding temperature in order to solve the problem of molding distortion, it is preferred that problems such as silver streaks do not occur. Specifically, it is preferred that molding defects, such as silver streaks, are hardly observed when molding is consecutively carried out for 50 shots at a barrel temperature of 290° C. and a mold temperature of 60° C.

Specifically, molding processability can be evaluated by the method described in the below-described Examples.

(Thermal Stability)

When producing the vehicle part cover according to the present embodiment by injection molding, a few shots worth of resin in a molten state may remain in the molding machine. In such a case, the resin dwells for a long time under a high temperature, so the resin material needs to have resistance to thermal degradation.

Specifically, it is preferred that the weight loss ratio when held for 30 minutes at about 270° C. is 2% or less, more preferred is 1.5% or less, even more preferred is 1.0% or less, and still even more preferred is 0.5% or less.

Further, it is preferred that the weight loss ratio when held for 30 minutes at about 290° C. is 6% or less, more preferred is 5% or less, even more preferred is 3% or less, still even more preferred is 2.5% or less, and yet still even more preferred is 2% or less.

The amount of thermal degradation when held for 30 minutes at 270° C. and the amount of thermal degradation when held for 30 minutes at 290° C. can be measured by the method described in the below-described Examples.

When the vehicle part cover according to the present embodiment is used as an instrument cover, from the perspective of reducing molding distortion in order to increase visibility, it is necessary to perform the molding at a high temperature, and hence high thermal stability is required.

From this perspective, when the vehicle part cover according to the present embodiment is used as an instrument cover, it is preferred that the thermal degradation start temperature of the methacrylic-based resin or the methacrylic-based resin composition is 300° C. or more, more preferred is 310° C. or more, even more preferred is 320° C. or more, still even more preferred is 325° C. or more, and yet still even more preferred is 330° C. or more.

Specifically, the thermal degradation start temperature can be measured by the method described in the below-described Examples.

As described above, to prevent thermal degradation of the methacrylic-based resin or the methacrylic-based resin composition, and to obtain thermal stability that is excellent in practice, in the methacrylic-based resin (I) included in the vehicle part cover according to the present embodiment, it is effective to relatively reduce the amount of methacrylate monomer unit (component (A) and component (A')) to be copolymerized by increasing the ratio of the structural unit (B) having a ring structure in its main chain.

However, if the ratio of component (B) with respect to the methacrylate monomer unit (component (A) and component (A')) is too high, since the properties, such as molding fluidity and surface hardness, required as a vehicle part cover may not be obtained, it is necessary to define the ratio of the (component (A) and component (A')) and component (B) in consideration of the balance among these properties.

Increasing the copolymer ratio of the structural unit (B) having a ring structure in its main chain is effective in terms of suppressing a degradation reaction caused by depolymerization when exposed to a high temperature. If the ratio of component (B) with respect to the methacrylate monomer unit (component (A) and component (A')) is increased, sufficient thermal stability can be imparted even if the amount of thermal stabilizer is reduced.

On the other hand, if the ratio of the methacrylate monomer unit (component (A) and component (A')) is relatively large, the amount of thermal degradation under a high-temperature environment increases. In order to suppress thermal degradation, a thermal stabilizer can be added, but adding too much thermal stabilizer deteriorate heat resistance, and can also cause problems such as bleed out during molding.

To obtain the properties that are demanded for a vehicle part cover, as described above, when a blending ratio of the thermal stabilizer based on 100 parts by mass of methacrylic-based resin is set as (Y: parts by mass), from the perspective of the balance among suppression of thermal degradation under a high temperature, molding processability, and heat resistance, it is preferred for the methacrylate monomer unit, the structural unit (B) having a ring structure in its main chain, and the blending ratio of the thermal stabilizer satisfy the following formula (i).

$$(Y) \geq 0.053 \times [\text{methacrylate monomer unit content}/(B) \text{ content}] - 0.4 \quad (i)$$

Further, if the methacrylic-based resin included in the vehicle part cover according to the present embodiment is only the above-described methacrylic-based resin (I), it is preferred that the following formula (i-1) is satisfied, and if this methacrylic-based resin included is a mixture of the above-described methacrylic-based resin (I) and methacrylic-based resin (II), it is preferred that the following formula (i-2) is satisfied.

$$(Y) \geq 0.053 \times [(A)\text{content}/(B)\text{content}] - 0.4 \quad \text{formula (i-1)}$$

$$(Y) \geq 0.053 \times [(A)+(A')\text{content}/(B)\text{content}] - 0.4 \quad \text{formula (i-2)}$$

It is more preferred that $(Y) \geq 0.053 \times$[methacrylate monomer unit content/(B) content]$-0.35$, even more preferred that $(Y) \geq 0.053 \times$[methacrylate monomer unit content/(B) content]$-0.3$, still even more preferred that $(Y) \geq 0.053 \times$[methacrylate monomer unit content/(B) content]$-0.27$, and still even more preferred that $(Y) \geq 0.053 \times$[methacrylate monomer unit content/(B) content]$-0.25$.

[Applications]

The vehicle part cover according to the present embodiment can be suitably used in various applications.

For example, the vehicle part cover can be suitably used, in automobiles and motorcycles, as a vehicle instrument cover in applications such as various vehicle clock covers, indicator covers, combination meter covers, meter covers, and vehicle head-up displays; or as a vehicle rear lamp cover such as a tail lamp cover, a rear combination lamp cover, and a high mount stop lamp cover.

EXAMPLES

The present invention will now be described using specific Examples and Comparative Examples. However, the present invention is not limited to these Examples.

[Raw Materials]

The raw materials used in the below-described Examples and Comparative Examples are shown below. Component (A):

(A-1): Methyl methacrylate (MMA), manufactured by Asahi Kasei Chemicals Corporation (to which 2.5 ppm of 2,4-dimethyl-6-t-butylphenol, manufactured by CBC Co., Ltd., is added as a polymerization inhibitor)

(A-2): Cyclohexyl methacrylate, manufactured by Asahi Kasei Chemicals Corporation (A-3): Phenyl methacrylate, manufactured by Wako Pure Chemical Industries, Ltd.

Component (B):

(B-1): N-Phenyl maleimide (NPMI), manufactured by Nippon Shokubai Co., Ltd.

(B-2): N-Cyclohexyl maleimide (NCyMI), manufactured by Nippon Shokubai Co., Ltd.

Component (C):

(C-1): Styrene (St), manufactured by Asahi Kasei Chemicals Corporation (C-2-1): Methyl acrylate (MA), manufactured by Mitsubishi Chemical Corporation (to which 14 ppm of 4-methoxyphenol, manufactured by Kawaguchi Chemical Industry Co., Ltd., is added as a polymerization inhibitor)

(C-2-2): Ethyl acrylate (EA), manufactured by Mitsubishi Chemical Corporation (C-3): Acrylonitrile (AN), manufactured by Asahi Kasei Chemicals Corporation Component (D):

(D-1): Maleic anhydride (MAH), manufactured by Mitsui Chemicals, Inc.

Component (E):

(E-1): Irganox 1076: octadecyl-3-(3,5-di-t-butyl-4-hydroxyphenyl)propionate, manufactured by Ciba Specialty Chemicals Inc.

(E-2): Irganox 1010: pentaerythritol tetrakis[3-(3,5-di-t-butyl-4-hydroxyphenyl)propionate], manufactured by Ciba Specialty Chemicals Inc.

(E-3): Sumilizer GS: 2-[1-(2-hydroxy-3,5-di-tert-pentylphenyl)ethyl]-4,6-di-tert-pentylphenyl acrylate, manufactured by Sumitomo Chemical Co., Ltd.

(E-4): Sumilizer GM: 2-tert-butyl-4-methyl-6-(2-hydroxy-3-tert-butyl-5-methylbenzyl)phenyl acrylate, manufactured by Sumitomo Chemical Co., Ltd.

(E-5): Irgafos 168: tris(2,4-di-t-butylphenyl)phosphite, manufactured by Ciba Specialty Chemicals Inc.

(Other Components):

n-Octyl mercaptan (NOM), manufactured by Arkema K.K.

Lauroyl peroxide, (LPO), manufactured by NOF Corporation Tricalcium phosphate (III), manufactured by Nippon Chemical Industrial Co., Ltd., used as a suspension agent Calcium carbonate, manufactured by Shiraishi Kogyo Kaisha, Ltd., used as a suspension agent Sodium lauryl sulfate, manufactured by Wako Pure Chemical Industries, Ltd, used as a suspension auxiliary aid 2-(2-Hydroxy-5-methylphenyl)benzotriazole (2-(2H-Benzotriazol-2-yl)-p-cresol), JF77, manufactured by Johoku Chemical Co., Ltd., used as a UV absorber (Calculation Formula of Amount of Thermal Stabilizer to be Added)

$0.053 \times$[(methacrylate monomer unit content)/(B)]$-0.4$ was calculated using the mass ratio of methacrylate monomer to component (B):methacrylate monomer/(B). The calculated results were shown in Tables 2 to 5.

Note that in Examples 1 to 15 and Comparative Examples 1 to 7 of Tables 2 to 4, the methacrylate monomer corresponds to the above-described component (A), and in Examples 16 to 23 and Comparative Examples 8 and 9 of Table 5, the methacrylate monomer corresponds to a total of the above-described component (A) and the methacrylate monomer (A') component used in the below-described Production Examples 1 to 3.

Further, although the amount of thermal stabilizer required to obtain sufficiently good thermal stability in practice can be calculated based on the above-described formula, the amount of thermal stabilizer required which can be regarded as 0 parts by mass is shown as "<0" in the tables.

[Measurement Method]

(I. Molecular Weight Measurement of Methacrylic-Based Resin)

The weight average molecular weight of the methacrylic-based resin was measured with the below-described apparatus and under the following conditions. Measurement apparatus: Gel permeation chromatography (HLC-8320GPC), manufactured by Tosoh Corporation Columns: One TSKguardcolumn SuperH-H column, two TSKgel SuperHM-M columns, and one TSKgel SuperH2500 column connected in series in this order were used.

In the columns, components with high molecular weights are eluted quickly, and components with low molecular weights take a longer time to be eluted.

Detector: RI (differential refractive index) detector

Detection sensitivity: 3.0 mV/min

Column temperature: 40° C.

Sample: 20 mL solution of 0.02 g of methacrylic-based resin in tetrahydrofuran

Injection volume: 10 µL

Developing solvent: Tetrahydrofuran, flow rate of 0.6 mL/min

As an internal standard, 0.1 g/L of 2,6-di-t-butyl-4-methylphenol (BHT) was added.

As the calibration curve standard samples, the following 10 types of monodisperse methyl polymethacrylates having known weight peak molecular weights and differing molecular weights (manufactured by Polymer Laboratories Ltd., PMMA Calibration Kit M-M-10) were used.

Weight Peak Molecular Weight (Mp)
Standard Specimen 1: 1,916,000
Standard Specimen 2: 625,500
Standard Specimen 3: 298,900
Standard Specimen 4: 138,600
Standard Specimen 5: 60,150
Standard Specimen 6: 27,600
Standard Specimen 7: 10,290
Standard Specimen 8: 5,000
Standard Specimen 9: 2,810
Standard Specimen 10: 850

Under the above conditions, the RI detection intensity versus elution time of the methacrylic-based resin was measured.

The weight average molecular weight (Mw) of the methacrylic-based resin was determined based on the fractional area under the GPC elution curve and a 7-th order approximation equation calibration curve.

(II. Measurement of Amount of Residual Monomers)

The amount of residual monomers included in the methacrylic-based resin was measured under the following conditions with the below-described apparatus.

Sample: A 4 mm-thick test specimen produced in the below-described <1. Heat Resistance, Measurement of Vicat Softening Temperature> was cut into samples for measurement of amount of residual monomers.

Measurement apparatus: GC-1700 manufactured by Shimadzu Corporation
Column used: TC-1 φ 0.32 mm×30 m×0.25 μm
Carrier gas: Nitrogen (1.3 mL/min)
Split ratio: (1:5)
Linear velocity: 23 cm/sec
Column pressure: 42 kPa
Total flow: 11 mL/min
Injection volume: 0.8 μL
Preset temperature: INJ/DET=230° C./300° C.
Temperature program: 45° C. (maintained for 5 minutes)→ temperature increased to 90° C. at 10° C./min→ temperature increased to 190° C. at 30° C./min→ temperature increased to 220° C. at 10° C./min→ temperature increased to 300° C. at 50° C./min Note that the amount of residual monomers was calculated using a calibration curve prepared in advance for the monomer species to be measured.

In the following tables, the amount of residual monomers represents the total amount of the residual monomer species used in polymerization, and the amount of residual MI monomers represents the total amount of the residual maleimide monomers used as component (B).

(III. Measurement of Physical Properties)

<1. Heat Resistance, Measurement of Vicat Softening Temperature>

Measurement was carried out in accordance with ISO 306 B50 using a 4 mm-thick test specimen to determine the Vicat softening temperature (° C.). This value was used as an index for heat resistance evaluation.

<2. Transparency, Measurement of Total Light Transmittance>

Measurement of the total light transmittance was carried out in accordance with the ISO 13468-1 standard using a 3 mm-thick test specimen. This value was used as an index for transparency.

<3-1. Test of Resistance to Heat and Moisture>

Test specimens 3 mm-thick×100 mm-wide×100 mm-long were produced using the IS-100EN injection molding machine manufactured by Toshiba Machine Co., Ltd., at a molding temperature of 270° C. and a mold temperature of 60° C. The shape of the test specimens after leaving for 500 hours in a constant temperature and humidity bath set to a temperature of 90° C. and a humidity of 95% was observed and evaluated based on the following criteria. Deformation such as distortion was observed: "X" Slight deformation was observed: "Δ" Almost no deformation was observed: "○"

<3-2. Test of Resistance to Heat and Moisture (Rate of Change in Haze Value (Color Hue Change)>

Test specimens about 3 mm-thick× about 40 mm-wide× about 60 mm-long were produced using the IS-75S injection molding machine manufactured by Toshiba Machine Co., Ltd., at a molding temperature of 270° C. and a mold temperature of 60° C. Changes in the color hue were measured by measuring the haze value before and after the test specimens were left for 1,000 hours in a constant temperature and humidity bath set to a temperature of 80° C. and a humidity of 95% Rh in accordance with JIS-K7136 to determine the rate of change in haze value.

<4. Molding Processability 1: Fluidity During Molding>

Test specimens about 3.2 mm-thick× about 12.7 mm-wide× about 127 mm-long were produced by injection molding using the IS-100EN injection molding machine manufactured by Toshiba Machine Co., Ltd., at a molding temperature of 250° C., a mold temperature of 60° C., an injection pressure of 56 MPa, an injection time of 20 seconds, and a cooling time of 40 seconds, and evaluated based on the following criteria.
Test specimen could be obtained: "○"
Short shot was observed due to poor fluidity: "X"

<5. Molding Processability 2: Occurrence of Silver Streaks and Occurrence of Cracks During Mold Release>

Using specimens dried for 8 hours in a steam oven set to 85° C., 50 test specimens with a size of 3 mm-thick×100 mm-wide×100 mm-long were consecutively produced using the IS-100EN injection molding machine manufactured by Toshiba Machine Co., Ltd., at a molding temperature of 290° C. and a mold temperature of 60° C., and evaluated based on the following criteria.
(Occurrence of Silver Streaks)
Silver streaks were observed in 10 or more test specimens: "X"
Silver streaks were observed in 2 to 9 test specimens: "○"
Silver streaks were observed in 1 or less samples: "⊙"
(Occurrence of Cracks During Mold Release)
Cracks occurred in a molded piece during mold release: "×"
Cracks did not occur: "○"

<6. Visibility>

Using specimens dried for 8 hours in a steam oven set to 85° C., test specimens with a size of 3 mm-thick×100 mm-wide×100 mm-long were prepared using the IS-100EN injection molding machine manufactured by Toshiba Machine Co., Ltd., at a molding temperature of 270° C. and a mold temperature of 60° C. The test specimens were observed through a polarizing film (registered trademark "TECH SPEC") with a light source placed to the rear of the test specimens, and evaluated based on the following criteria.

Many moire patterns were observed: "×"
Not many moire patterns were observed: "○"

<7. Thermal Stability Evaluation>
(1% Weight Loss Temperature)

The thermal degradation start temperature was determined by calculating the temperature at which weight decreased by 1% by measuring with the following apparatus under the below-described conditions.

Measurement apparatus: Differential type differential thermal balance Thermo plus EVO II TG8120 (manufactured by Rigaku Corporation)

Sample preparation: By the same method as described above in the test specimen production method in <4. Molding Processability 1: Fluidity During Molding>, test specimens with a size of about 3 mm-thick× about 40 mm-wide× about 60 mm-long were produced, and about 10 mg of the following measurement sample was prepared by cutting said test specimens.

Amount of sample: About 10 mg
Measurement atmosphere: Nitrogen (100 mL/min)
Measurement conditions: Held at 100° C. for 5 minutes→ temperature increased to 400° C. at 10° C./min. Point at which weight had decreased by 1% was determined as the above-described thermal degradation start temperature (1% weight loss temperature).

(Amount of Degradation after Holding at 290° C. for 30 Minutes and Amount of Degradation after Holding at 270° C. for 30 Minutes)

Further, the weight loss ratio after holding at about 270° C. for 30 minutes and the weight loss ratio after holding at about 290° C. for 30 minutes were calculated by performing measurement under the following setting conditions (1) and (2), respectively.

Measurement apparatus: Differential type differential thermal balance Thermo plus EVO II TG8120 (manufactured by Rigaku Corporation)

Amount of sample: About 10 mg
Measurement atmosphere: Nitrogen (100 mL/min)
(Setting conditions (1)): Held at 50° C. for 2 minutes→ temperature increased to 200° C. at 50° C./min→ temperature increased to 250° C. at 20° C./min→ temperature increased to set temperature of 284° C. at 10° C./min. and maintained for 60 minutes. Weight loss ratio after 30 minutes had elapsed from start of the holding was calculated. Note that the measurement temperature for the set temperature of 284° C. was about 290° C.

(Setting conditions (2)): Held at 50° C. for 2 minutes→ temperature increased to 200° C. at 20° C./min→ temperature increased to 250° C. at 20° C./min→ temperature increased to set temperature of 265° C. at 10° C./min. and maintained for 60 minutes. Weight loss ratio after 30 minutes had elapsed from start of the holding was calculated. Note that the measurement temperature for the set temperature of 265° C. was about 270° C.

<8. Measurement of Pencil Hardness>

Test specimens with a size of about 3 mm-thick× about 40 mm-wide× about 60 mm-long were produced using the IS-75S injection molding machine manufactured by Toshiba Machine Co., Ltd., at a molding temperature of 270° C. and a mold temperature of 60° C. The produced test specimens were dried for 10 hours in a 90° C. oven, and measurement was carried out in accordance with JIS-K-5600-5-4.

<9. Tissue Paper Scratchability>

Using sample dried for 8 hours in a steam oven set to 85° C., test specimens with a size of 3 mm-thick×20 mm-wide× 220 mm-long were prepared using the IS-100EN injection molding machine manufactured by Toshiba Machine Co., Ltd., at a molding temperature of 270° C. and a mold temperature of 60° C.

A pair of tissue paper sheets Nepia (registered trademark (100% fresh pulp, dimensions: length 197 mm× width 217 mm, containing 150 pairs) manufactured by Oji Nepia Co., Ltd., placed for 168 hours or more at room temperature of about 23° C. and indoor humidity of about 50% Rh (23° C./50% Rh) was folded into 12 equal portions and fixed to a jig with a contact area of 2 cm×2 cm. Using a reciprocating wiping tester RT-200 (manufactured by Daiei Kagaku Seiki Mfg. Co., Ltd.), the state of scratches left on the obtained test specimens after sliding the jig back and forth 20 times at a sliding rate of 33 mm/second under a mass including the jig of 200 g was visually observed.

The evaluation was made as follows: test specimens for which no scratches having a length of 3 cm or more were observed were rated as "○," and test specimens for which scratches having a length of 3 cm or more were observed were rated as "X."

<10. Overall Evaluation>

In the above-described evaluations, test specimens recognized as being suitable for application as a vehicle part cover were rated as "○." However, test specimens in which a defect was seen in any of the evaluations, and which were hence recognized as not being suitable for application as a vehicle part cover, were rated as "X."

The method of producing the methacrylic-based resin (I) is described below.

The raw materials and the additive amounts are shown in the following Table 1.

Further, the ratio of the monomers charged into a reaction system, and the type and additive amount of thermal stabilizer, are shown in the following Tables 2 to 4.

Example 1

Two kg of water, 65 g of tricalcium phosphate, 39 g of calcium carbonate, and 0.39 g of sodium lauryl sulfate were charged into a vessel having a stirring device provided with 4 inclined paddle blades to obtain a mixed solution (a).

Next, 26 kg of water was charged into a 60 L reactor having a stirring device provided with 3 retracting blades, and the temperature was increased to 40° C., and then the mixed solution (a) and the raw materials of the methacrylic-based resin in the amounts shown in the following Table 1 were charged therein in the ratio shown in Table 2.

Then, the temperature was increased to 75° C. at a rate of about 1° C./min, suspension polymerization was carried out by maintaining the temperature at about 75° C., and an exothermic peak was observed about 150 minutes after charging the raw material mixture.

Subsequently, the temperature was increased to about 96° C. at a rate of about 1° C./min, the solution was then aged for 120 minutes, and the polymerization reaction was essentially finished.

Next, the resultant mixture was cooled to 50° C., and then 20% by mass of sulfuric acid was added to dissolve the suspension agent.

Next, the polymerization reaction solution was passed through a sieve having a 1.68 mm mesh to remove agglomerates, water was separated by filtration, and the obtained slurry was dewatered to obtain a bead-shaped polymer. The obtained bead-shaped polymer was washed with water, then dewatered in the same manner as above, and further washed by repeatedly washing with deionized water and dewatering to obtain polymer particles.

The above-described polymer particles obtained were blended with the above-described thermal stabilizer (E-1) in the amount shown in the following Table 2. The UV absorber JF77 (manufactured by Johoku Chemical Co., Ltd.) was further blended at 300 ppm with respect to the resin component. The resultant mixture was melt-kneaded with a φ 30 mm twin-screw extruder set to 240° C., and the strands were cooled and cut to obtain resin pellets. It was confirmed that extrusion workability during this operation was good.

Using the obtained pellets, an injection molded object was obtained, and the above-described physical properties of the molded object were evaluated. The evaluation results are shown in the following Table 2.

Examples 2 to 12, 14, and 15, and Comparative Examples 1 to 6

Using the raw materials shown in the following Table 1, polymerization was carried out in the same manner as in the above-described Example 1 and polymer particles were obtained.

The above-described polymer particles obtained were blended with the above-described component (E), the type and amount of which are shown in the following Tables 2 to 4, the resultant mixture was melt-kneaded with a φ 30 mm twin-screw extruder set to 240° C., and the strands were cooled and cut to obtain resin pellets. It was confirmed that extrusion workability during this operation was good.

Further, the results of measuring the physical properties of a molded object of the methacrylic-based resin of Examples 2 to 14, and 15, and Comparative Examples 1 to 6 are shown in the following Tables 2 to 4.

Example 13

Two kg of water, 65 g of tricalcium phosphate, 39 g of calcium carbonate, and 0.39 g of sodium lauryl sulfate were charged into a vessel having a stirring device provided with 4 inclined paddle blades to obtain a mixed solution (a).

Next, 26 kg of water was charged into a 60 L reactor having a stirring device provided with 3 retracting blades, the temperature was increased to 75° C., and then the mixed solution (a) and the raw materials of the methacrylic-based resin in the additive amounts shown in the following Table 1 were charged therein in the ratio shown in Table 3.

Then, suspension polymerization was carried out by maintaining the temperature at about 75° C., and an exothermic peak was observed about 130 minutes after charging the raw material mixture.

Subsequently, the temperature was increased to about 92° C. at a rate of about 1° C./min, the solution was then aged for 120 minutes, and the polymerization reaction was essentially finished.

Next, the resultant mixture was cooled to 50° C., and then 20% by mass of sulfuric acid was added to dissolve the suspension agent.

Next, the polymerization reaction solution was passed through a sieve having a 1.68 mm mesh to remove agglomerates, water was separated by filtration, and the obtained slurry was dewatered to obtain a bead-shaped polymer. The obtained bead-shaped polymer was washed with water, then dewatered in the same manner as above, and further washed by repeatedly washing with deionized water and dewatering to obtain polymer particles.

The above-described polymer particles obtained were blended with the above-described thermal stabilizers (E-1) and (E-3) in the amount shown in the following Table 3. The resultant mixture was further blended and melt-kneaded with a φ 30 mm twin-screw extruder set to 240° C., and the strands were cooled and cut to obtain resin pellets. It was confirmed that extrusion workability during this operation was good.

Using the obtained pellets, an injection molded object was obtained, and the above-described physical properties of the molded object were evaluated. The evaluation results are shown in the following Table 3.

Comparative Example 7

Using a vessel equipped with a stirring device, a monomer blend solution was prepared by mixing and dissolving 78 parts by mass of methyl methacrylate, 14 parts by mass of styrene, 8 parts by mass of maleic anhydride, 0.03 parts by mass of lauroyl peroxide, and 0.23 parts by mass of n-octyl mercaptan.

On the other hand, a cell was prepared by applying a flexible gasket made of vinyl chloride around outer periphery of two glass sheets having a size of 250×300 mm and a thickness of 6 mm so that the distance between the two glass sheets was 3.5 mm.

A devolatilization operation was carried out for 2 minutes while stirring the above-described monomer blend solution under a reduced pressure of 50 Torr. Then, the pressure was returned to normal by releasing the vacuum, and the monomer blend solution was immediately poured into the glass cell to fill it.

Next, the glass cell filled with the monomer blend solution was held for 22 hours in a warm water bath having a temperature adjusted to 60 to 65° C., then held for 3 hours in a circulating hot air oven having a temperature adjusted to 110° C. The glass cell was then left to cool in a room, and the glass sheets were removed to obtain a sheet-like resin.

The thus-obtained sheet-like resin was milled with the coarse mill Orient Mill, type VM-42D, manufactured by Seishin Enterprise Co., Ltd., provided with a 10 mm mesh, the milled product was then passed through a sieve of 500 μm, and the fine powder was removed to obtain a milled composition.

The recovery ratio of the milled composition was 93.2%.

The obtained milled composition, 0.2 parts by mass of the above-described (E-1), and 0.4 parts by mass of the above-described (E-5) were blended, and the resultant mixture was melt-kneaded with a φ 30 mm twin-screw extruder set to 240° C., and the strands were cooled and cut to obtain resin pellets.

It was confirmed that extrusion workability during this operation was good.

Using the obtained pellets, an injection molded object was produced, and the above-described physical properties of the molded object were evaluated. The evaluation results are shown in the following Table 4.

TABLE 1

| | Methacrylate-based Resin Raw Materials/g | | | | | | | | | | |
|---|---|---|---|---|---|---|---|---|---|---|---|
| | (A) | | | (B) | | (C) | | | | Initiator | Chain Transfer Agent |
| | (A-1) | (A-2) | (A-3) | (B-1) | (B-2) | (C-1) | (C-2-1) | (C-2-2) | (C-3) | LPO | NOM |
| Example 1 | 17600 | | | 4280 | | 1900 | | | | 42 | 48 |
| Example 2 | 14500 | | | 5750 | | 2760 | | | | 34 | 44 |
| Example 3 | 18600 | | | 3250 | | 1390 | | | | 41 | 49 |
| Example 4 | 18300 | | | 2290 | 2290 | 0 | | | | 41 | 34 |
| Example 5 | 18900 | | | 2260 | | 1360 | | | | 45 | 52 |
| Example 6 | 19000 | | | 2790 | | 1390 | | | | 41 | 49 |
| Example 7 | 18600 | | | 3000 | | 1160 | 460 | | | 40 | 47 |
| Example 8 | 18600 | | | 3000 | | 1160 | | 460 | | 40 | 47 |
| Example 9 | 18900 | | | 2260 | | 1130 | | | 230 | 45 | 41 |
| Example 10 | 19300 | 690 | | 2280 | | 460 | | | | 46 | 53 |
| Example 11 | 18400 | | 650 | 2200 | | 440 | | | | 44 | 44 |
| Example 12 | 19300 | | | 1500 | | 870 | | | | 46 | 43 |
| Example 13 | 18600 | | | 3250 | | 1390 | | | | 41 | 49 |
| Example 14 | 21200 | | | 900 | | 450 | | | | 45 | 40 |
| Example 15 | 18500 | | | 2200 | | 1330 | | | | 42 | 44 |
| Comparative Example 1 | 22400 | | | | | 0 | 700 | | | 46 | 56 |
| Comparative Example 2 | 23200 | | | | | 0 | | | | 46 | 46 |
| Comparative Example 3 | 22100 | | | 450 | | 0 | | | | 41 | 47 |
| Comparative Example 4 | 18800 | | | 2260 | | 1360 | | | | 52 | 118 |
| Comparative Example 5 | 17400 | | | 2090 | | 1250 | | | | 27 | 14 |
| Comparative Example 6 | 10700 | | | 6600 | | 3300 | | | | 31 | 50 |

TABLE 2

| | | | Example 1 | Example 2 | Example 3 | Example 4 | Example 5 | Example 6 | Example 7 | Example 8 |
|---|---|---|---|---|---|---|---|---|---|---|
| Resin | (A-1) Methyl methacrylate | /parts by mass | 74 | 63 | 80 | 80 | 84 | 82 | 80 | 80 |
| | (A-2) Cyclohexyl methacrylate | /parts by mass | | | | | | | | |
| | (A-3) Phenyl methacrylate | /parts by mass | | | | | | | | |
| | (B-1) N-Phenyl maleimide | /parts by mass | 18 | 25 | 14 | 10 | 10 | 12 | 13 | 13 |
| | (B-2) N-Cyclohexyl maleimide | /parts by mass | | | | 10 | | | | |
| | (C-1) Styrene | /parts by mass | 8 | 12 | 6 | | 6 | 6 | 5 | 5 |
| | (C-2-1) Methyl acrylate | /parts by mass | | | | | | | 2 | |
| | (C-2-2) Ethyl acrylate | /parts by mass | | | | | | | | 2 |
| | (C-3) Acrylonitrile | /parts by mass | | | | | | | | |
| | (D-1) Maleic anhydride | /parts by mass | | | | | | | | |
| | Total | /parts by mass | 100 | 100 | 100 | 100 | 100 | 100 | 100 | 100 |
| Thermal Stabilizer | (E-1) Irganox 1076 | /parts by mass | 0.15 | 0.1 | 0.2 | 0.1 | 0.2 | 0.12 | 0.1 | |
| | (E-2) Irganox 1010 | /parts by mass | | | | | | | | |
| | (E-3) Sumilizer GS | /parts by mass | | | | | 0.05 | | | 0.6 |
| | (E-4) Sumilizer GM | /parts by mass | | | | 0.1 | | | | |
| | (E-5) Irgafos 168 | /parts by mass | | | | | | 0.2 | | |
| Amount of Thermal Stabilizer Required | $0.053 \times [(A)/(B)] - 0.4$ | | <0 | <0 | <0 | <0 | 0.045 | <0 | <0 | <0 |
| Amount of Residual Monomers | Total amount of residual monomers | /parts by mass | 0.38 | 0.39 | 0.37 | 0.55 | 0.42 | 0.36 | 0.51 | 0.46 |
| | Amount of MI residual monomers | /parts by mass | 0.09 | 0.11 | 0.09 | 0.41 | 0.05 | 0.06 | 0.15 | 0.16 |
| Properties | Weight average molecular weight | | 130,000 | 130,000 | 120,000 | 170,000 | 110,000 | 120,000 | 130,000 | 130,000 |
| | Vicat softening temperature/° C. | | 129 | 136 | 122 | 132 | 121 | 124 | 123 | 120 |
| | Thermal stability evaluation—1% Weight loss temperature | | 335 | 336 | 336 | 333 | 330 | 338 | 333 | 332 |
| | Thermal stability evaluation—Amount of degradation/% when held at 270° C./0.5 h | | 0.4 | 0.5 | 0.4 | 0.8 | 0.8 | 0.3 | 0.6 | 0.6 |

TABLE 2-continued

|  | Example 1 | Example 2 | Example 3 | Example 4 | Example 5 | Example 6 | Example 7 | Example 8 |
|---|---|---|---|---|---|---|---|---|
| Thermal stability evaluation—Amount of Degradation/% when held at 290° C./0.5 h | 1.4 | 1.3 | 1.6 | 1.9 | 1.9 | 1.5 | 1.9 | 1.8 |
| Total light transmittance/% | 90 | 90 | 90 | 91 | 90 | 90 | 90 | 90 |
| Resistance to heat and moisture 90° C./95%/500 h | ○ | ○ | ○ | ○ | ○ | ○ | ○ | ○ |
| Molding processability 1 (fluidity during molding) | ○ | ○ | ○ | ○ | ○ | ○ | ○ | ○ |
| Molding processability (occurrence of silver streaks) 290° C./60° C. | ◎ | ◎ | ◎ | ◎ | ◎ | ◎ | ◎ | ◎ |
| Rate of change in haze (ΔHz)/ 80° C./95% Rh/1000 h | 0.12 | 0.23 | 0.09 | 0.21 | 0.24 | 0.15 | 0.24 | 0.14 |
| Molding processability (occurrence of cracks during mold release) | ○ | ○ | ○ | ○ | ○ | ○ | ○ | ○ |
| Pencil hardness | 2H | 2H | 2H | 3H | 2H | 2H | 2H | 2H |
| Scratch resistance (tissue paper scratchability) | ◎ | ◎ | ◎ | ○ | ◎ | ◎ | ◎ | ◎ |
| Visibility | ○ | ○ | ○ | ○ | ○ | ○ | ○ | ○ |
| Overall Evaluation | ○ | ○ | ○ | ○ | ○ | ○ | ○ | ○ |

TABLE 3

|  |  |  | Example 9 | Example 10 | Example 11 | Example 12 | Example 13 | Example 14 | Example 15 |
|---|---|---|---|---|---|---|---|---|---|
| Resin | (A-1) Methyl methacrylate | /parts by mass | 84 | 85 | 85 | 89 | 80 | 94 | 84 |
|  | (A-2) Cyclohexyl methacrylate | /parts by mass |  | 3 |  |  |  |  |  |
|  | (A-3) Phenyl methacrylate | /parts by mass |  |  |  | 3 |  |  |  |
|  | (B-1) N-Phenyl maleimide | /parts by mass | 10 | 10 | 10 | 7 | 14 | 4 | 10 |
|  | (B-2) N-Cyclohexyl maleimide | /parts by mass |  |  |  |  |  |  |  |
|  | (C-1) Styrene | /parts by mass | 5 | 2 | 2 | 4 | 6 | 2 | 6 |
|  | (C-2-1) Methyl acrylate | /parts by mass |  |  |  |  |  |  |  |
|  | (C-2-2) Ethyl acrylate | /parts by mass |  |  |  |  |  |  |  |
|  | (C-3) Acrylonitrile | /parts by mass |  |  | 1 |  |  |  |  |
|  | (D-1) Maleic anhydride | /parts by mass |  |  |  |  |  |  |  |
|  | Total | /parts by mass | 100 | 100 | 100 | 100 | 100 | 100 | 100 |
| Thermal Stabilizer | (E-1) Irganox 1076 | /parts by mass |  |  |  |  | 0.2 | 0.7 |  |
|  | (E-2) Irganox 1010 | /parts by mass | 0.3 |  | 0.1 |  |  |  |  |
|  | (E-3) Sumilizer GS | /parts by mass |  |  |  |  | 0.1 |  |  |
|  | (E-4) Sumilizer GM | /parts by mass |  |  |  |  |  |  |  |
|  | (E-5) Irgafos 168 | /parts by mass |  |  |  | 0.25 |  |  |  |
| Amount of Thermal Stabilizer Required | 0.053 × [(A)/(B)] − 0.4 |  | 0.05 | 0.07 | 0.07 | 0.27 | <0 | 0.85 | 0.05 |
| Amount of Residual Monomers | Total amount of residual monomers | /parts by mass | 0.38 | 0.49 | 0.65 | 0.32 | 0.62 | 0.21 | 0.48 |
|  | Amount of MI residual monomers | /parts by mass | 0.09 | 0.19 | 0.24 | 0.1 | 0.52 | 0.09 | 0.11 |
| Properties | Weight average molecular weight |  | 140,000 | 110,000 | 130,000 | 130,000 | 120,000 | 100,000 | 130,000 |
|  | Vicat softening temperature/° C. |  | 120 | 119 | 121 | 117 | 122 | 113 | 122 |
|  | Thermal stability evaluation—1% Weight loss temperature |  | 329 | 332 | 332 | 324 | 332 | 319 | 329 |
|  | Thermal stability evaluation—Amount of degradation/% when held at 270° C./0.5 h |  | 0.8 | 0.6 | 0.6 | 0.9 | 0.6 | 1.2 | 0.7 |
|  | Thermal stability evaluation—Amount of Degradation/% when held at 290° C./0.5 h |  | 1.9 | 2.6 | 2.2 | 2.3 | 1.9 | 2.9 | 2.3 |
|  | Total light transmittance/% |  | 90 | 91 | 90 | 90 | 90 | 90 | 90 |
|  | Resistance to heat and moisture 90° C./95%/500 h |  | ○ | ○ | ○ | ○ | ○ | ○ | ○ |
|  | Molding processability (fluidity during molding) |  | ○ | ○ | ○ | ○ | ○ | ○ | ○ |
|  | Molding processability (occurrence of silver streaks) 290° C./60° C. |  | ○ | ○ | ◎ | ○ | ◎ | ◎ | ◎ |
|  | Rate of change in haze (ΔHz)/ 80° C./95% Rh/1000 h |  | — | 0.61 | 0.48 | 0.53 | 0.36 | 0.61 | 0.51 |
|  | Molding processability (occurrence of cracks during mold release) |  | ○ | ○ | ○ | ○ | ○ | ○ | ○ |

TABLE 3-continued

|  | Example 9 | Example 10 | Example 11 | Example 12 | Example 13 | Example 14 | Example 15 |
|---|---|---|---|---|---|---|---|
| Pencil hardness | 2H | 2H | 2H | 2H | 2H | 2H | 2H |
| Scratch resistance (tissue paper scratchability) | ◎ | ◎ | ◎ | ◎ | X | ○ | ◎ |
| Visibility | ○ | ○ | ○ | ○ | ○ | ○ | ○ |
| Overall Evaluation | ○ | ○ | ○ | ○ | ○ | ○ | ○ |

TABLE 4

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Resin | (A-1) Methyl methacrylate | /parts by mass | 97 | 100 | 98 | 84 | 84 | 52 | 78 |
| | (A-2) Cyclohexyl methacrylate | /parts by mass | | | | | | | |
| | (A-3) Phenyl methacrylate | /parts by mass | | | | | | | |
| | (B-1) N-Phenyl maleimide | /parts by mass | | | | 2 | 10 | 10 | 32 |
| | (B-2) N-Cyclohexyl maleimide | /parts by mass | | | | | | | |
| | (C-1) Styrene | /parts by mass | | | | 6 | 6 | 16 | 14 |
| | (C-2-1) Methyl acrylate | /parts by mass | 3 | | | | | | |
| | (C-2-2) Ethyl acrylate | /parts by mass | | | | | | | |
| | (C-3) Acrylonitrile | /parts by mass | | | | | | | |
| | (D-1) Maleic anhydride | /parts by mass | | | | | | | 8 |
| | Total | /parts by mass | 100 | 100 | 100 | 100 | 100 | 100 | 100 |
| Thermal Stabilizer | (E-1) Irganox 1076 | /parts by mass | | | 0.7 | 0.2 | 0.2 | 0.2 | 0.2 |
| | (E-2) Irganox 1010 | /parts by mass | | | | | | | |
| | (E-3) Sumilizer GS | /parts by mass | | | | | | | |
| | (E-4) Sumilizer GM | /parts by mass | | | | | | | |
| | (E-5) Irgafos 168 | /parts by mass | 0.2 | 1.2 | | | | | 0.4 |
| Amount of Thermal Stabilizer Required | $0.053 \times [(A)/(B)] - 0.4$ | | | | 2.20 | 0.05 | 0.05 | <0 | |
| Amount of Residual Monomers | Total amount of residual monomers | /parts by mass | 0.34 | 0.56 | 0.45 | 0.36 | 0.41 | 0.37 | 0.38 |
| | Amount of MI residual monomers | /parts by mass | 0 | 0 | 0.01 | 0.05 | 0.07 | 0.08 | 0 |
| Properties | Weight average molecular weight | | 100,000 | 130,000 | 130,000 | 60,000 | 350,000 | 120,000 | 120,000 |
| | Vicat softening temperature/° C. | | 109 | 109 | 111 | 121 | 121 | 143 | 119 |
| | Thermal stability evaluation—1% Weight loss temperature | | 298 | 290 | 310 | 316 | 331 | 338 | 291 |
| | Thermal stability evaluation—Amount of degradation/% when held at 270° C./0.5 h | | 2.6 | 3.1 | 1.5 | 1.6 | 0.9 | 0.5 | 2.3 |
| | Thermal stability evaluation—Amount of Degradation/% when held at 290° C./0.5 h | | 5.8 | 6.8 | 3.8 | 3.4 | 1.5 | 0.8 | 6.9 |
| | Total light transmittance/% | | 92 | 92 | 91 | 90 | 90 | — | 91 |
| | Resistance to heat and moisture 90° C./95%/500 h | | X | X | X | Δ | ○ | ○ | X |
| | Molding processability (fluidity during molding) | | ○ | ○ | ○ | ○ | X | — | ○ |
| | Molding processability (occurrence of silver streaks) 290° C./60° C. | | ○ | X | X | X | ◎ | ◎ | X |
| | Rate of change in haze (ΔHz)/80° C./95% Rh/1000 h | | 0.22 | — | 0.24 | 0.52 | 0.28 | 0.67 | 1.32 |
| | Molding processability (occurrence of cracks during mold release) | | ○ | ○ | ○ | X | ○ | ○ | ○ |
| | Pencil hardness | | 2H | 2H | 2H | 2H | 2H | H | 2H |
| | Scratch resistance (tissue paper scratchability) | | ◎ | ◎ | ◎ | X | ◎ | ◎ | X |
| | Visibility | | ○ | ○ | ○ | ○ | ○ | X | X |
| Overall Evaluation | | | X | X | X | X | X | X | X |

In Examples 1 to 15, sufficient heat resistance was exhibited, the transparency and resistance to heat and moisture, which are required for a vehicle part cover, especially for an instrument cover and a tail lamp cover, were good, and molding processability was excellent.

[Alloy Resin]

An alloy resin was produced by combining the methacrylic-based resin (I) produced in the above-described Examples 1, 4, 6, and 7 and the methacrylic-based resin (II) produced in the below-described (Production Example 1) to (Production Example 3), and the physical properties of the produced alloy resins were evaluated in the same manner as in the above-described Example 1.

Production of Alloy Resin

Production Example 1

Two kg of water, 65 g of tricalcium phosphate, 39 g of calcium carbonate, and 0.39 g of sodium lauryl sulfate were charged into a vessel having a stirring device provided with 4 inclined paddle blades to obtain a mixed solution (A).

Next, 26 kg of water was charged into a 60 L reactor, the temperature was increased to 80° C., the mixed solution (A) was charged, and a polymer raw material (I) obtained by mixing 5,700 g of methyl methacrylate (A'), 30 g of lauroyl peroxide, and 122 g of 2-ethylhexylthioglycolate was charged.

Then, suspension polymerization was carried out by maintaining the temperature at about 80° C. An exothermic peak was observed 100 minutes after charging the polymer raw material (I).

Subsequently, the temperature was increased to 92° C. at a rate of 1° C./min, and the temperature was maintained at about 92° C. for 30 minutes.

Then, after the temperature was decreased to 80° C. at a rate of 1° C./min, a polymer raw material (II) obtained by mixing 17,300 g of methyl methacrylate (A'), 440 g of methyl acrylate, 24 g of lauroyl peroxide, and 29 g of n-octyl mercaptan was charged into the reactor, and suspension polymerization was carried out by continuously maintaining the temperature at about 80° C. An exothermic peak was observed 120 minutes after charging the polymer raw material (II).

Subsequently, the temperature was increased to 92° C. at a rate of 1° C./min and the solution was aged for 60 minutes, and the polymerization reaction was essentially finished.

Next, the resultant mixture was cooled to 50° C., and then 20% by mass of sulfuric acid was added to dissolve the suspension agent.

Next, the polymerization reaction solution was passed through a sieve having a 1.68 mm mesh to remove agglomerates, water was separated by filtration, and the obtained slurry was dewatered to obtain a bead-shaped polymer. The obtained bead-shaped polymer was washed with aqueous sodium hydroxide adjusted to a pH of about 8 to 9.5, then dewatered in the same manner as above, and further washed by repeatedly washing with deionized water and dewatering to obtain polymer particles.

This polymer had a weight average molecular weight measured by GPC of 100,000, and a Vicat softening temperature of 109° C.

Production Example 2

Two kg of water, 65 g of tricalcium phosphate, 39 g of calcium carbonate, and 0.39 g of sodium lauryl sulfate were charged into a vessel having a stirring device provided with 4 inclined paddle blades to obtain a mixed solution (A).

Next, 26 kg of water was charged into a 60 L reactor, the temperature was increased to 80° C., the mixed solution (A) was added, and a polymer raw material obtained by mixing in advance 21,900 g of methyl methacrylate (A'), 560 g of methyl acrylate, 45 g of lauroyl peroxide, and 54 g of n-octyl mercaptan was further charged.

Then, suspension polymerization was carried out by maintaining the temperature at about 80° C. An exothermic peak was observed 120 minutes after charging the above-described polymer raw material.

Subsequently, the temperature was increased to 92° C. at a rate of 1° C./min, and the temperature was maintained at about 92° C. for 60 minutes, and the polymerization reaction was essentially finished.

Next, the resultant mixture was cooled to 50° C., and then 20% by mass of sulfuric acid was added to dissolve the suspension agent.

Next, the polymerization reaction solution was passed through a sieve having a 1.68 mm mesh to remove agglomerates, water was separated by filtration, and the obtained slurry was dewatered to obtain a bead-shaped polymer. The obtained bead-shaped polymer was washed with aqueous sodium hydroxide adjusted to a pH of about 8 to 9.5, then dewatered in the same manner as above, and further washed by repeatedly washing with deionized water and dewatering to obtain polymer particles.

This polymer had a weight average molecular weight measured by GPC of 100,000, and a Vicat softening temperature of 109° C.

Production Example 3

Using a vessel equipped with a stirring device, a monomer mixed solution was prepared by mixing and dissolving 78 parts by mass of methyl methacrylate (A'), 14 parts by mass of styrene, 8 parts by mass of maleic anhydride, 0.03 parts by mass of lauroyl peroxide, and 0.23 parts by mass of n-octyl mercaptan.

On the other hand, a cell was prepared by applying a flexible gasket made of vinyl chloride around outer periphery of two glass sheets having a size of 250×300 mm and a thickness of 6 mm so that the distance between the two glass sheets was 3.5 mm.

A devolatilization operation was carried out for 2 minutes while stirring the above-described monomer blend solution under a reduced pressure of 50 Torr. Then, the pressure was returned to normal by releasing the vacuum, and the monomer blend solution was immediately poured into the glass cell to fill it.

Next, the glass cell filled with the monomer blend solution was held for 22 hours in a warm water bath having a temperature adjusted to 60 to 65° C., then held for 3 hours in a circulating hot air oven having a temperature adjusted to 110° C. The glass cell was then left to cool in a room, and the glass sheets were removed to obtain a sheet-like resin.

The thus-obtained sheet-like resin was milled with the coarse mill Orient Mill, type VM-42D, manufactured by Seishin Enterprise Co., Ltd., provided with a 10 mm mesh, the milled product was then passed through a sieve of 500 μm, and the fine powder was removed to obtain a milled product.

The amount of methyl methacrylate (A') in this milled composition can be calculated based on NMR measurement data of a product obtained by dissolving the obtained resin in acetone, performing reprecipitation from methanol to remove residual monomers, and subsequently drying.

[Examples 16 to 23], [Comparative Examples 8 and 9]

The polymer particles obtained in Production Examples 1 and 2 and in Examples 1, 4, 6, and 7, the milled product obtained in Production Example 3, and other predetermined material, were blended in the blending ratios shown in the following Table 5, the resultant mixtures were melt-kneaded with a φ 30 mm twin-screw extruder set to 240° C., and the strands were cooled and cut to obtain resin pellets.

Using the obtained pellets, an injection molded object was produced, and the above-described physical properties of the molded object were evaluated. The evaluation results are shown in the following Table 5.

TABLE 5

| | | | Example 16 | Example 17 | Example 18 | Example 19 | Example 20 | Example 21 | Example 22 | Example 23 | Comparative Example 8 | Comparative Example 9 |
|---|---|---|---|---|---|---|---|---|---|---|---|---|
| Resin | Example 1 | /parts by mass | 75 | 75 | 50 | 25 | | | | 25 | | |
| | Example 4 | /parts by mass | | | | | | 25 | | | | |
| | Example 6 | /parts by mass | | | | | 90 | | | | | |
| | Example 7 | /parts by mass | | | | | | | 75 | | | |
| | Production Example 1 | /parts by mass | 25 | | 50 | 75 | 10 | 75 | | 75 | | |
| | Production Example 2 | /parts by mass | | 25 | | | | | 25 | | 100 | |
| | Production Example 3 | /parts by mass | | | | | | | | | | 100 |
| Thermal Stabilizer | (E-1) Irganox 1076 | /parts by mass | 0.15 | 0.15 | | | 0.2 | | 0.2 | | 0.2 | |
| | (E-2) Irganox 1010 | /parts by mass | | | 0.2 | 0.7 | | 0.4 | 0.2 | | | |
| | (E-3) Sumilizer GS | /parts by mass | | | | | | 0.2 | | | | |
| | (E-5) Irgafos 168 | /parts by mass | | | | | | | | | 0.2 | 0.4 |
| Ratio Based on 100% by Mass of Resin | NPMI | /% by mass | 13.5 | 13.5 | 9 | 4.5 | 10.8 | 2.5 | 9.8 | 4.5 | | |
| | NCyMI | /% by mass | | | | | | 2.5 | | | | |
| | St | /% by mass | 6 | 6 | 4 | 2 | 5.4 | | 1.3 | 2 | | |
| Amount of Thermal Stabilizer Required | 0.053 × [(A) + (A')/(B)] − 0.4 | | <0 | <0 | 0.10 | 0.68 | 0.01 | 0.59 | 0.06 | 0.68 | | |
| Amount of Residual Monomers | Total amount of residual monomers | /parts by mass | 0.34 | 0.32 | 0.33 | 0.31 | 0.35 | 0.42 | 0.42 | 0.36 | 0.34 | 0.38 |
| | Amount of MI residual monomers | /parts by mass | 0.07 | 0.07 | 0.05 | 0.08 | 0.04 | 0.11 | 0.11 | 0.1 | 0 | 0 |
| Properties | Weight average molecular weight | | 130,000 | 120,000 | 120,000 | 120,000 | 120,000 | 130,000 | 130,000 | 120,000 | 100,000 | 120,000 |
| | Vicat softening temperature/° C. | | 124 | 124 | 119 | 114 | 122 | 115 | 119 | 114 | 109 | 119 |
| | Thermal stability evaluation—1% Weight loss temperature | | 331 | 332 | 332 | 330 | 329 | 330 | 330 | 319 | 298 | 291 |
| | Thermal stability evaluation—Amount of degradation/% when held at 270° C./0.5 h | | 0.4 | 0.5 | 0.4 | 0.4 | 0.8 | 0.4 | 0.4 | 0.8 | 2.6 | 2.3 |
| | Thermal stability evaluation—Amount of Degradation/% when held at 290° C./0.5 h | | 1.4 | 1.3 | 1.6 | 1.7 | 1.9 | 1.7 | 1.7 | 4.2 | 5.8 | 6.9 |
| | Total light transmittance/% | | 91 | 91 | 91 | 92 | 91 | 92 | 91 | 92 | 92 | 91 |
| | Resistance to heat and moisture 90° C./95%/500 h | | ○ | ○ | ○ | Δ | ○ | ○ | ○ | Δ | X | X |
| | Molding processability (fluidity during molding) | | ○ | ○ | ○ | ○ | ○ | ○ | ○ | ○ | ○ | ○ |
| | Molding processability (occurrence of silver streaks) 290° C./60° C. | | ◎ | ◎ | ◎ | ◎ | ◎ | ◎ | ◎ | ○ | ○ | X |
| | Rate of change in haze (ΔHz)/80° C./95% Rh/1000 h | | 0.16 | 0.16 | 0.15 | 0.15 | 0.2 | 0.22 | 0.19 | 0.25 | 0.22 | 1.32 |
| | Molding processability (occurrence of cracks during mold release) | | ○ | ○ | ○ | ○ | ○ | ○ | ○ | ○ | ○ | ○ |
| | Pencil hardness | | 2H | 2H | 2H | 2H | 2H | 2H | 2H | 2H | 2H | 2H |
| | Scratch resistance (tissue paper scratchability) | | ◎ | ◎ | ◎ | ◎ | ◎ | ◎ | ◎ | ◎ | ◎ | X |
| | Visibility | | ○ | ○ | ○ | ○ | ○ | ○ | ○ | ○ | ○ | X |
| Overall Evaluation | | | ○ | ○ | ○ | ○ | ○ | ○ | ○ | ○ | X | X |

The meaning of the symbols shown in Table 5 is as follows.
NPMI: N-phenylmaleimide
NCyMI: N-cyclohexylmaleimide
St: Styrene In Examples 16 to 23, sufficient heat resistance was exhibited, the transparency and resistance to heat and moisture, which are required for a vehicle part cover, especially for an instrument cover, were good, and molding processability was excellent.

INDUSTRIAL APPLICABILITY

The vehicle part cover according to the present invention has industrial applicability as a vehicle instrument cover such as a meter cover for automobiles and motorcycles, an automobile interior part such as a vehicle head-up display application, and an automobile exterior part application such as a tail lamp cover, a rear combination lamp cover, a headlamp lens, a visor, and a pillar.

The invention claimed is:

1. A vehicle part cover comprising a methacrylic-based resin (I) having a weight average molecular weight measured by gel permeation chromatography (GPC) of 65,000 to 300,000 and a weight loss ratio of 6% or less when held for 30 minutes at 290° C.,
the methacrylic-based resin (I) comprising:
50 to 97% by mass of a methacrylate monomer unit (A);
3 to 30% by mass of a structural unit (B) having a ring structure in its main chain, and being at least one selected from the group consisting of a maleimide-based structural unit, a glutaric anhydride structural unit, a glutarimide-based structural unit, and a lactone ring structural unit; and
0 to 20% by mass of another vinyl monomer unit (C) that is copolymerizable with a methacrylate monomer.

2. The vehicle part cover according to claim 1, wherein the structural unit (B) having a ring structure in its main chain comprises at least one structural unit selected from the group consisting of a glutarimide-based structural unit, a lactone ring structural unit, and a maleimide-based structural unit.

3. The vehicle part cover according to claim 1, wherein the structural unit (B) having a ring structure in its main chain comprises a maleimide-based structural unit.

4. The vehicle part cover according to claim 1, wherein the structural unit (B) having a ring structure in its main chain comprises a N-cyclohexylmaleimide-based structural unit and/or a N-aryl group-substituted maleimide-based structural unit.

5. The vehicle part cover according to claim 1, wherein the structural unit (B) having a ring structure in its main chain comprises a N-aryl group-substituted maleimide-based structural unit.

6. The vehicle part cover according to claim 1, wherein the another vinyl monomer unit (C) that is copolymerizable with the methacrylate monomer is formed from at least one selected from the group consisting of an acrylate monomer, an aromatic vinyl monomer, and a vinyl cyanide monomer.

7. The vehicle part cover according to claim 1, wherein the another vinyl monomer unit (C) that is copolymerizable with the methacrylate monomer is formed from at least one selected from the group consisting of methyl acrylate, ethyl acrylate, styrene, and acrylonitrile.

8. The vehicle part cover according to claim 1, having a Vicat softening temperature of 110° C. or more.

9. The vehicle part cover according to claim 1, having a thickness of 0.1 to 5 mm.

10. The vehicle part cover according to claim 1, wherein the vehicle part cover is:
a vehicle instrument cover selected from the group consisting of a vehicle clock cover, an indicator cover, a combination meter cover, a meter cover, and a vehicle head-up display, or
vehicle rear lamp cover selected from the group consisting of a tail lamp cover, a rear combination lamp cover, and a high mount stop lamp cover.

11. The vehicle part cover according to claim 1, wherein the vehicle part cover is a vehicle instrument cover selected from the group consisting of a vehicle clock cover, an indicator cover, a combination meter cover, a meter cover, and a vehicle head-up display.

12. The vehicle part cover according to claim 1, wherein the vehicle part cover is a vehicle rear lamp cover selected from the group consisting of a tail lamp cover, a rear combination lamp cover, and a high mount stop lamp cover.

13. The vehicle part cover according to claim 1, comprising 10 to 99% by mass of the methacrylic-based resin (I), and further comprising 90 to 1% by mass of a methacrylic-based resin (II) that comprises at least 80 to 99.5% by mass of a methacrylate monomer unit (A'), and that has a weight average molecular weight measured by gel permeation chromatography (GPC) of 20,000 to 300,000.

14. The vehicle part cover according to claim 13, wherein a weight average molecular weight of methacrylic-based resin obtained by mixing the methacrylic-based resin (I) and the methacrylic-based resin (II) is 65,000 to 300,000.

15. The vehicle part cover according to claim 1, further comprising 0 parts by mass to 5 parts by mass of a thermal stabilizer based on 100 parts by mass of the methacrylic-based resin.

16. The vehicle part cover according to claim 15, wherein the thermal stabilizer is at least one selected from the group consisting of a hindered phenol antioxidant and a phosphorus-based antioxidant.

17. The vehicle part cover according to claim 15, wherein a content ratio Y (parts by mass) of the thermal stabilizer based on 100 parts by mass of the methacrylic-based resin satisfies the following formula (i):

$$(Y) \geq 0.053 \times [\text{methacrylate monomer unit content}/(B) \text{ content}] - 0.4 \quad (i).$$

18. The vehicle part cover according to claim 17, wherein the thermal stabilizer is at least one selected from the group consisting of a hindered phenol antioxidant and a phosphorus-based antioxidant.

19. The vehicle part cover according to claim 17, wherein the methacrylic-based resin (I) comprises more than 0% by mass of the another vinyl monomer unit (C).

* * * * *